United States Patent
Day et al.

(10) Patent No.: US 9,531,885 B2
(45) Date of Patent: Dec. 27, 2016

(54) APPARATUS, SYSTEM, AND METHOD FOR VISUALIZING TELECOMMUNICATIONS RESOURCES

(71) Applicant: Level 3 Communications, LLC, Broomfield, CO (US)

(72) Inventors: Timothy S. Day, Brighton, CO (US); Shannon Griffith, Thornton, CO (US); Takashi E. Tatsumoto, Denver, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 14/748,019

(22) Filed: Jun. 23, 2015

(65) Prior Publication Data

US 2015/0373207 A1 Dec. 24, 2015

Related U.S. Application Data

(60) Provisional application No. 62/016,447, filed on Jun. 24, 2014.

(51) Int. Cl.
*H04W 24/00* (2009.01)
*H04M 15/00* (2006.01)
(Continued)

(52) U.S. Cl.
CPC .... *H04M 15/8027* (2013.01); *G06F 17/30241* (2013.01); *G06F 17/30876* (2013.01);
(Continued)

(58) Field of Classification Search
CPC ...... H04W 16/00; H04W 16/18; H04W 24/02; H04W 24/10; H04W 28/00; H04W 64/00; H04W 64/003; G06F 17/30241; G06F 17/30876; H04M 15/8027
(Continued)

(56) References Cited

U.S. PATENT DOCUMENTS

2004/0156372 A1  8/2004  Hussa
2005/0251568 A1  11/2005  Zavgren
(Continued)

OTHER PUBLICATIONS

International Search Report dated Sep. 8, 2015, Int'l Appl. No. PCT/US15/037244, Int'l Filing Date Jun. 23, 2015; 3 pgs.
(Continued)

*Primary Examiner* — Jean Gelin

(57) ABSTRACT

Aspects of the present disclosure involve systems, methods, computer program products, for obtaining information concerning a telecommunications network from various databases and/or informational spreadsheets, aggregating the information into a database, and displaying the information to aid in providing a telecommunication service to a customer. In one embodiment, the information in the database may be provided to an administrator of the telecommunications network through a user interface available to the administrator. With the information provided, the administrator may determine the network services available to a potential customer of the network and may generate a plan to provide the services to the customer's location. The information may include one or more connection locations to the telecommunications network and provide an estimated cost to the network and/or the customer for providing the service to the customer, including providing information to a field technician for installation of the service.

20 Claims, 23 Drawing Sheets

(51) Int. Cl.
*G06F 17/30* (2006.01)
*H04W 24/10* (2009.01)
*H04L 12/24* (2006.01)
*H04W 64/00* (2009.01)

(52) U.S. Cl.
CPC ...... *G06F 17/30994* (2013.01); *H04L 41/145* (2013.01); *H04L 41/22* (2013.01); *H04W 24/10* (2013.01); *H04W 64/00* (2013.01)

(58) Field of Classification Search
USPC ............. 455/414.1, 446, 456.1, 456.2, 456.3
See application file for complete search history.

(56) References Cited

U.S. PATENT DOCUMENTS

| | | |
|---|---|---|
| 2005/0255861 A1 | 11/2005 | Wilson et al. |
| 2007/0203836 A1* | 8/2007 | Dodin .................... G06Q 20/02 705/44 |
| 2008/0262897 A1 | 10/2008 | Howarter et al. |
| 2010/0195516 A1* | 8/2010 | McReynolds ....... H04L 43/0876 370/252 |
| 2013/0035993 A1 | 2/2013 | Hungate |
| 2013/0122932 A1* | 5/2013 | Patel ....................... H04W 4/02 455/456.2 |
| 2013/0132140 A1 | 5/2013 | Amin et al. |
| 2013/0179224 A1 | 7/2013 | Nadiadi et al. |

OTHER PUBLICATIONS

Written Opinion of the International Searching Authority dated Sep. 8, 2015, Int'l Appl. No. PCT/US15/037244, Int'l Filing Date Jun. 23, 2015; 5 pgs.

* cited by examiner

APPARATUS, SYSTEM, AND METHOD FOR VISUALIZING TELECOMMUNICATIONS RESOURCES

CROSS-REFERENCE TO RELATED APPLICATIONS

This application claims priority under 35 U.S.C. §119(e) to United States Provisional Application No. 62/016,447 entitled "APPARATUS, SYSTEM, AND METHOD FOR VISUALIZING TELECOMMUNICATIONS RESOURCES", filed on Jun. 24, 2014 which is incorporated by reference in its entirety herein.

FIELD OF THE DISCLOSURE

Embodiments of the present invention generally relate to systems and methods for implementing a telecommunications network, and more specifically for providing an aggregating information and providing a visualization of aspects of telecommunications network through a user interface.

BACKGROUND

Telecommunication networks provide for the transmission of information across some distance through terrestrial, wireless or satellite communication networks. Such communications may involve voice, data or multimedia information, among others. Customers to the telecommunications network may utilize the network to exchange such information. As such, the telecommunications network may provide one or more services related to the exchange of information over the network to its customers.

Potential customers of the telecommunications network may contact a network administrator to connect to the network and begin receiving services. For example, a customer may contact a network administrator to receive telephone service and/or Internet service from the network. When receiving a request for services from the network, administrators of the telecommunication network identify one or more properties of the network related to the requested service. These properties of the network may include available bandwidth, connection to the network locations, the availability of the service to the customer's specific location, the cost of providing the service to the customer, and the like. These properties may be available to the network administrator through various databases and informational sheets about the telecommunications network. With this information, the administrator may provide the customer with the availability and an estimated cost of the requested service. Further, the administrator may generate an order to one or more field installers to provide the requested service to the customer.

It is with these and other issues that various aspects of the present disclosure were developed.

SUMMARY

One implementation of the present disclosure may take the form of a method for visualizing telecommunications data for providing an estimated quote for a requested service. The method includes the operations of retrieving technical infrastructure data for a telecommunications network from one or more databases, the technical infrastructure data representing network footprints and connection locations and a map of a geographic region, obtaining location information for at least one requesting customer, and correlating the technical infrastructure data with the location information for the at least one requesting customer. The method also includes the operations of determining a network access point for providing one or more telecommunication products based on the correlation of the technical infrastructure data with the location information and generating a service plan and estimated cost based on the network access point and the at least one configured customer site using at least one computing unit. Another implementation is one or more non-transitory tangible computer-readable storage media storing computer-executable instructions for performing a computer process on a computing system of the same or similar operations.

Another implementation of the present disclosure may take the form of a system for aggregating telecommunications network data. The system includes at least one external database to a telecommunications network for storing mapping information, at least one internal database to the telecommunications network for storing network configuration information, and a visualization tool operating on a computing system, the computing system executing one or more computer-executable instructions retrieved from one or more non-transitory tangible computer-readable storage media storing computer-executable instructions for performing a computer process. Further, the computer process may include the operations of retrieving the network configuration information from the at least one internal database, the technical infrastructure data representing network footprints and connection locations and a map of a geographic region, obtaining location information for at least one requesting customer and associating the location information with the mapping information from the at least one external database, and correlating network configuration information with the location information for the at least one requesting customer. In addition, the computer process may include the further operations of determining a network access point for providing one or more telecommunication products based on the correlation of the network configuration information with the location information and generating a service plan and estimated cost based on the network access point and the at least one configured customer site using at least one computing unit.

DETAILED DESCRIPTION

Aspects of the present disclosure involve systems, methods, computer program products, and the like, for obtaining information concerning a telecommunications network from various databases and/or informational spreadsheets, aggregating the information into a database, and displaying the information to aid in providing a telecommunication service to a customer. In one embodiment, the information in the database may be provided to an administrator of the telecommunications network through a user interface available to the administrator. With the information provided, the administrator may determine the network services available to a potential customer of the network and may generate a plan to provide the services to the customer's location. In one example, the information may include one or more connection locations to the telecommunications network and provide an estimated cost to the network and/or the customer for providing the service to the customer. Further, in one embodiment, at least a portion of the order to provide the services to the potential customer may be generated from the information in the database and provided to a field technician for installation of the service.

The information curated in the database may be obtained from various sources. For example, a collection of mapping information for a specific geographic location may be obtained from a third party provider and stored in the database. Information concerning the physical layout or footprint of the telecommunications network may also be generated by the network or a network administrator and stored in the database. Additional information concerning other telecommunication networks or other types of data networks may also be obtained. Once the various information sources are obtained and stored in the database, a computing device or networking device may correlate the stored information into a format that is accessible by one or more network administrators. For example, the telecommunications network footprint may be correlated with the third party mapping information to provide a view to an administrator of the network within the geographic location. In general, any of the stored information may be combined and/or altered by the computing device or the database such that information concerning the provisioning of services to a customer may be determined. In this manner, network information may be easily obtained by one or more administrators of the telecommunications network in response to a request for providing telecommunications services to a customer or potential customer of the network.

Figure 1:
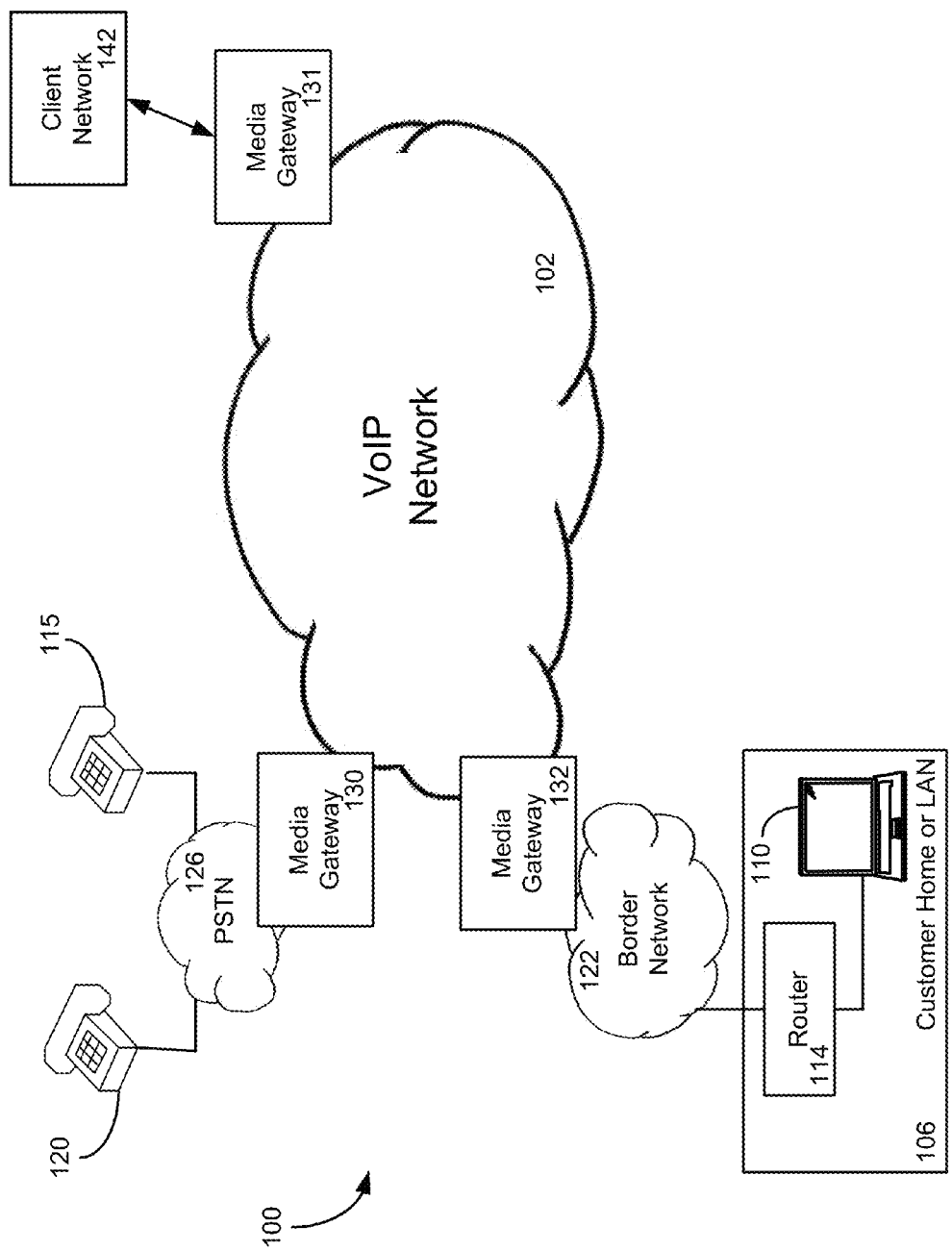
FIG. 1 schematic diagram illustrating an exemplary Voice over Internet Protocol (VoIP) operating environment in accordance with one embodiment.

FIG. 1 illustrates an exemplary telecommunications environment 100 for use in generating the telecommunications network footprint for service requests. The environment 100 provides for establishing communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that portions of the network 102 may include non IP-based routing. For example, network 102 may include devices utilizing time division multiplexing (TDM) or plain old telephone service (POTS) switching. In general, the network 102 of FIG. 1 may include any telecommunication network devices known or hereafter developed.

The VoIP network 102 includes numerous components such as, but not limited to gateways, routers, and registrars, which enable communication across the VoIP network 102, but are not shown or described in detail here because such devices and network configurations are readily understand by those of skill in the particular art. More relevant to this description is the interaction and communication between the VoIP network 102 and other entities, such as the one or more customer home or business local area networks (LANs) 106, where a user of the network will connect with the network and, more particularly, a virtual SCP 140 instantiated in the network.

Customer network 106 can include communication devices such as, but not limited to, a personal computer or an IP-based telephone device 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability.

For example, the communication device 110 may be wireless (e.g., cellular) telephone, smart phone, tablet or portable laptop computer. Other communication devices 115,120 (such as analog telephones or other communication devices) may connect to the network 102 through a public switched telephone network (PSTN) for providing communications to the network.

The customer network 106 typically connects to the VoIP network 102 via a border network 122 or access network, such as one provided by an Internet Service Provider (ISP). The border network 122 is typically provided and maintained by a business or organization such as a local telephone company or cable company. The border network 122 may provide network/communication-related services to their customers. In contrast, the communication device 120,115 accesses, and is accessed by, the VoIP network 102 via the PSTN 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a user of the network 102 utilizes one or more of the communication devices to transmit a communication to the network. For example, the user may place a telephone call to the network 102 from a telephone 120 associated with the network through the PSTN 126 and media gateway 130. In another example, the user may place a telephone call to the network 102 from an IP-based communication device 110 associated with the network through the border network 122 and the media gateway 132. Upon receipt, the network 102 routes the communication to a routing device 140 or routing devices integrated within the network 102.

Through the network configuration of FIG. 1, one or more telecommunication services may be provided to customers of the network. As discussed, the telecommunications network 102 may provide voice services or Internet services. Such services typically require a connection between the customer's communication device 110 or network 106 and the telecommunications network 102. Thus, to acquire such services, the customer may request the service from an administrator of the network 102. Upon receipt of a request for a service, the network administrator may determine how best to connect the customer's device 110 or network 106 to the telecommunications network 102. In one embodiment, connecting the customer to the network 102 may include providing a physical wire, trunk, or other type of physical connection between the network 102 or border network 112 and the user's device 110. Examples of the physical connection between the user's device 110 and the network 102 are discussed in more detail below.

To determine how to connect the user's device 110 to the network 102, the network administrator may utilize information stored in several databases, files, maps, etc., and develop a plan to provide, or "turn-up" the service for the customer. However, because the information may be stored in disparate locations and databases, this process was often time-consuming and costly. Further, the information may be difficult to correlate into a clear picture of the network footprint and available options for connecting the customer to the network service. Thus, the network 102 may create a database that accumulates information from the various information sources, whether internal to the network or from an external third party, and transforms and correlates the information into a viewable and useful format. Also, the correlated information may be presented to or otherwise available to the network administrator through a user interface such that the network administrator may quickly and easily develop a plan for providing the requested service to the network customer.

Figure 2:
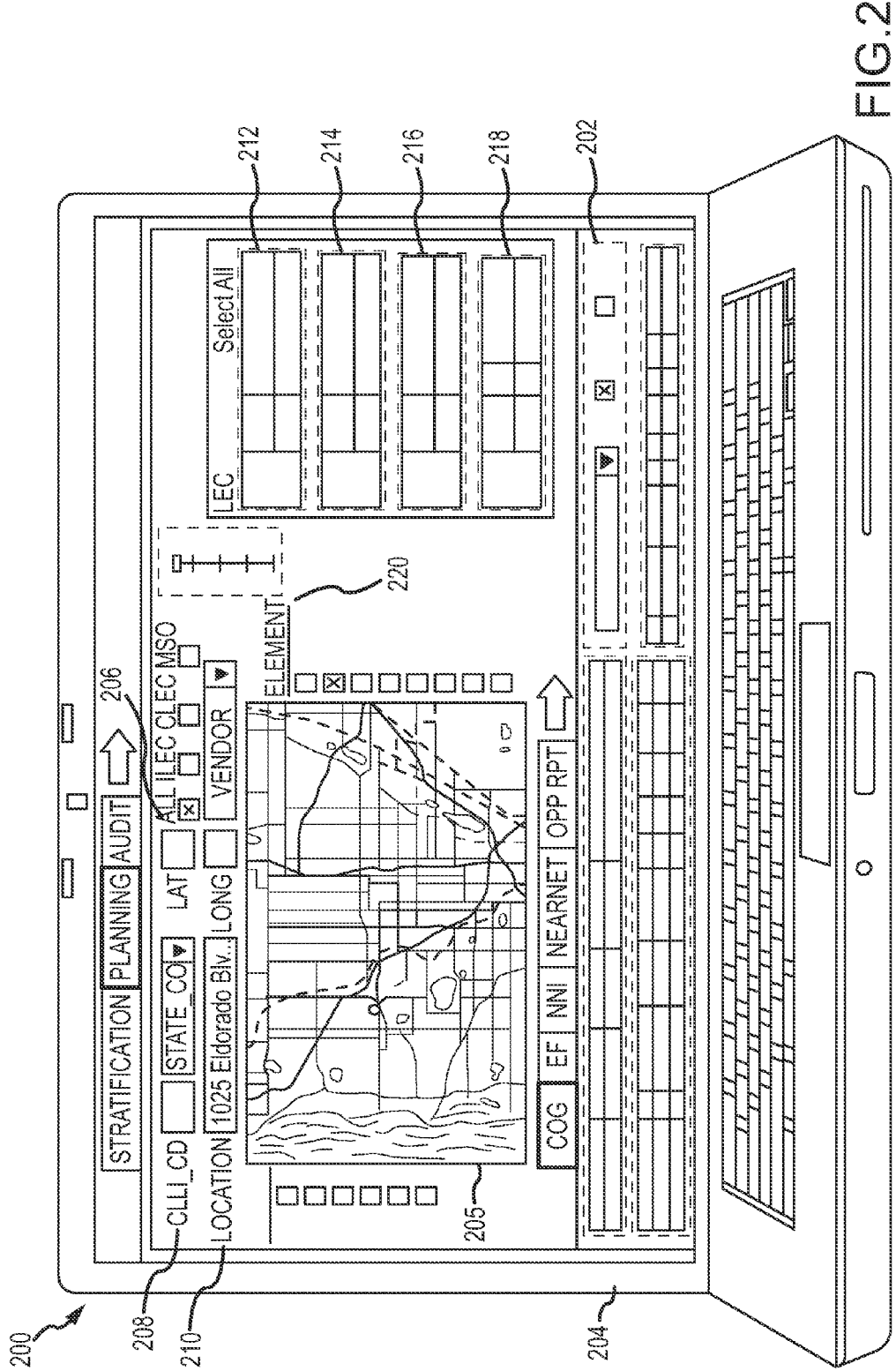
FIG. 2 is a screenshot of a user interface of a network visualization tool illustrating a portion of a network footprint for providing services to a user of the network.

FIG. 2 is a screenshot of a user interface of a network visualization tool illustrating a portion of a network footprint for providing services to a user of the network. While the various details of the network visualization tool 200 are described in greater detail below, in general, the network visualization tool provides a visual representation of network data from various sources. In particular, the visualization tool provides a user, through a user interface 202, information concerning a telecommunications network 102. The information presented may be utilized by the network or a network administrator to develop a plan for providing one or more services to a customer of the network. Such a plan may include providing market intelligence and provide orders to various field technicians to provide a connection point between the customer's location or device and the network. In addition, the information presented through the user interface 202 may be collected from various informational sources by the network visualization tool 200 and correlated into a presentable form. As further described below, the visualization tool 200 may be presented to a user of the tool through a computing device 204. The information presented in the visualization tool 200 generally includes information about a telecommunications network or networks gathered from various databases and other sources of network information.

The user interface 202 of the network footprint tool 300 may include, among other features, a visual map 205 of an area of concern based on a request for telecommunication services received by a network administrator. The location of the requested services and the associated map of the surrounding area may be based on one or more location identifiers, such as latitude and longitude 206, Common Language Location Identifier (CLLI) code 208, physical address 210, and the like. In addition, the user interface 202 allows a user to view and compare various data points within the mapped location 205 to compare available network services. For example, based on the location illustrated in the map 205 and received from the request for services, the Incumbent Local Exchange Carriers (ILEC) 212 for that area is determined and illustrated in the user interface 202. Similarly, a Multiple System Operator (MSO) 214 that provides services for the selected area 205 is also illustrated in the user interface 202. In general, MSOs is an operator of multiple cable or direct-broadcast satellite television systems. As many MSOs provide local Internet connection points to customers that utilize a telecommunications network to transmit the Internet traffic across the network, understanding the available MSOs in a particular area may be useful in determining how to provide Internet services to a potential customer of the network. Information concerning the LEC of the particular area 205 is also helpful for similar reasons. Competitive Local Exchange Carrier (CLEC) 216 information and other local vendors 218 may also be illustrated in the user interface 202 to aid in determining how best to provide telecommunication services to a customer of the network. In general, the CLEC is a telecommunications network or company that competes with the ILEC to provide telecommunications services to customers in a particular area. In one particular embodiment, the CLEC or CLECs illustrated in the user interface 202 may depend upon a mileage range from the received service location that is configurable by a user of the user interface. Additional information shown in the user interface 202 may include a fiber map of a telecommunications network (such as the network 102 of FIG. 1), the network's 102 leased infrastructure network, and third party price quotes per vendor and bandwidth within the illustrated mapped region.

Although all of the above mentioned information may be illustrated in the map 205, a user of the interface 202 may not want to view all of the available information at once. Thus, the user interface 202 may include an option to toggle or otherwise select to view or not view the various network information in the illustrated map 205. In the embodiment shown, selection of the box turns on or off the view of the associated information. The user interface 202 also provides for some flexibility in the view of the illustrated map 205 by allowing the user to plot points in the map and drill-down into features of the map. Other available displayed information of the user interface 202 includes displaying third party vendor contact information, network capacity management information, and telecommunication network 102 lease information. In addition, the user interface 202 allows for an administrator to input and export bulk information about the network, adjust MSO territories as companies merge, and/or provide system security and activity monitoring.

Figure 3:
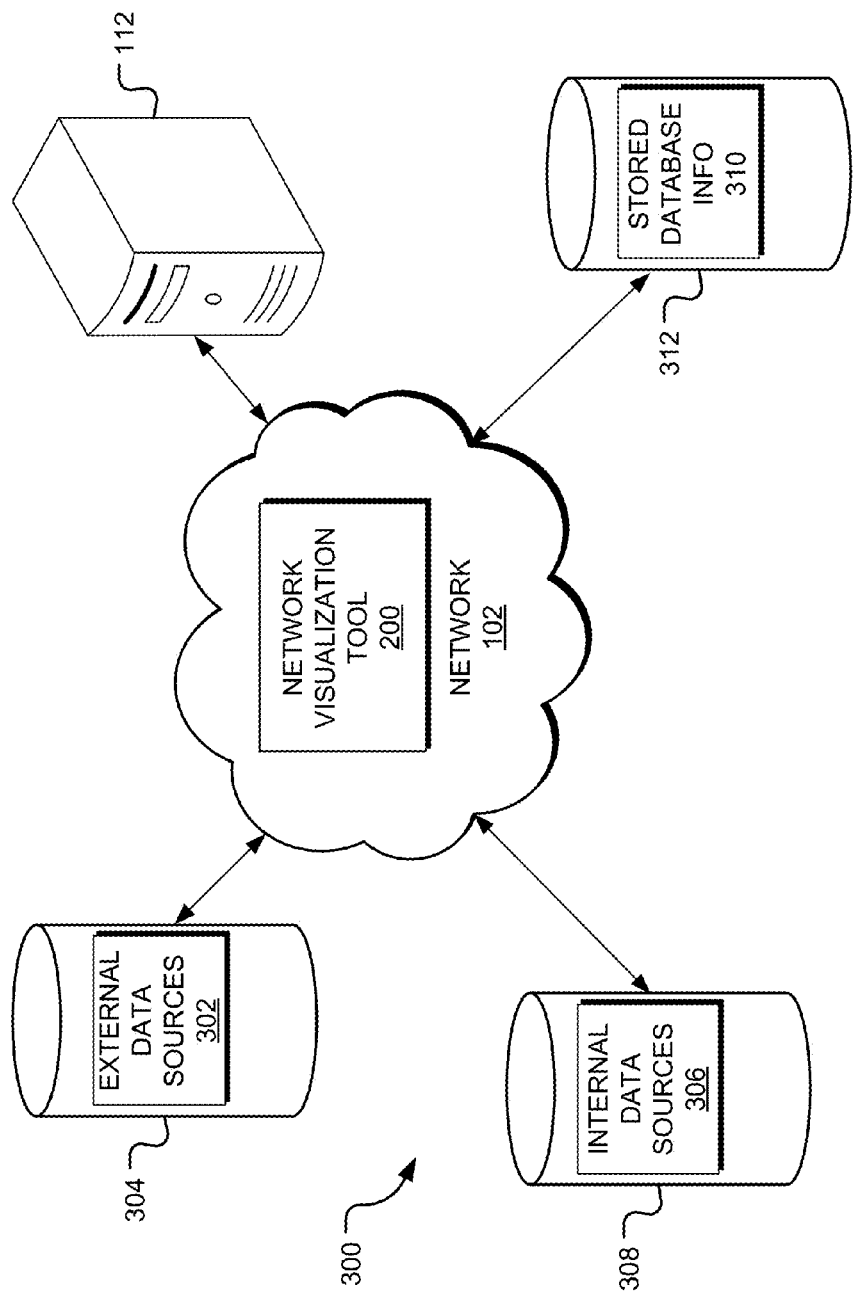
FIG. 3 is a schematic diagram of a network footprint tool for illustrating one or more portions of a telecommunications network.

FIG. 3 is a schematic diagram of a network footprint tool for illustrating one or more portions of a telecommunications network. In one implementation, a user may utilize a computing device to access and interact with a network footprint tool 300 via a network 102 (e.g., the Internet). The user device is generally any form of computing device capable of interacting with the network 102, such as a personal computer, terminal, laptop, mobile device, tablet, a multimedia console, server etc.

In one embodiment, the network visualization tool 200 may be executed on an application server 112 controlled by or otherwise a portion of the telecommunications network 102. The application server 112 may host a website or an application that one or more administrators may access to utilize the network visualization tool 200. The server 112 may be a single server, a plurality of servers with each such server being a physical server or a virtual machine running on a physical server, or a collection of both physical servers and virtual machines. In one particular embodiment, the server 112 is an internal SQL server database. The server 112 is in communication with one or more databases 114 to store and receive data, including external data sources and/or internal data sources to the network 102. In general, the user device 106, the server 112, and other resources connected to the network 102 may access one or more other servers to access one or more websites, applications, web services interfaces, storage devices, computing devices, or the like that are used to process and/or store the telecommunications network data. The server 112 may also host a search engine for accessing, searching for, and modifying the network information from the various network information sources.

As mentioned, the network visualization tool 200 may obtain network information from a variety of sources. For example, one or more external sources 304 databases or other information storage devices may store external data 302 concerning one or more telecommunications networks. Such external data 302 may include, but is not limited to, lists of incumbent cable companies including those operating as Multiple System Operators (MSOs) under the Federal Communications Commission (FCC) guidelines, including the operating or territory files for the MSOs. In one embodiment, the MSO information is indexed by postal code areas to define the MSO territory. Another source of external data 302 includes third party vendor information, including lists of building services and the available telecommunications components available from the third party vendor. As should be appreciated, any number of such external sources 304 may be accesses by the network visualization tool 200 to obtain external information 302 concerning the telecommunications network.

In addition to external sources 304, the network visualization tool 200 may obtain and incorporate information from any number of sources 308 internal to the telecommunications network 102. Such internal sources 304 include databases and/or computer files that include information about the implementation and layout of the telecommunications network 102. For example, the internal sources 304 may include, but are not limited to, internal corporate data about service agreements with customers of the network, maps of fiber optic layouts of the network, lists of available network space or components, services provided to particular buildings, lists and locations of competitive local exchange carriers (CLEC) and incumbent local exchange carriers (ILEC), lists and locations of network components indexed by a Common Language Location Identifier (CLLI), 911 emergency services information, and the like. In general, any internally generated document or database concerning the implementation of the network 102, whether located within the United States or international, may be accessed by the visualization tool 200.

In one implementation, the network visualization tool 200 is configured to receive and ingest the data from the various sources for storage. The providers data sources 302, 306 may be members of a consortium that include companies operating in the telecommunication industry, such as telecommunication providers and incumbent cable companies including those operating as MSOs. The information provided includes information associated with the various telecommunication networks or packages, including one or more telecommunication services, products, and/or systems, offered by the providers. The information may also include connection information for the network, such as the number and type of telecommunications connections (such as fiber trunks) to the selected locations. The information may also include Entrance Facility and Network-to-Network hub data.

In one implementation, the external data source 302 may include location information, such as maps indexed by latitude and longitude data or some other geographical location indexing information. Internal data sources 306 may include telecommunications data, maps of fiber locations for the network 102, and any other network information that may be useful in determining the services and footprint of the telecommunications network. External data information 302 may include third party vendor information such as telecommunication services provided to a building and FCC MSO territory information. In one embodiment, the MSO vendor information is normalized and territories are classified to postal code areas.

In one implementation, the network visualization tool 200 receives the data from each of the databases 304, 308, 312 using a variety of possible mechanisms. For example, the databases may connect to the visualization tool 200 to access and upload the database information using a browser operating on the user device, and the database may upload the database information to the visualization tool 200 using a file transfer protocol (FTP). The visualization tool 200 aggregates the database information by normalizing and establishing commonalities between the datasets received from the databases 304, 308, 312. In one implementation, the visualization tool 200 aggregates the information based on at least one of the attributes associated with a telecommunication packages available for a provider. For example, the visualization tool 200 may aggregate and/or group the data based on purchase information, infrastructure information, location information, pricing information, and/or the like.

In one implementation, a user of the system 300 may utilize the visualization tool 200 to create and edit a design for providing a customer telecommunication package or service at one or more customer sites and provide the design for the potential customer to an installer of such service. For example, the user may access the visualization tool 200 via a user interface displayed in a browser window running on the user device 204. The visualization tool 200 consolidates and generates telecommunication network information based on the aggregated data, thereby taking advantage of the telecommunication services available from local telecommunication providers. In this manner, the user of the visualization tool 200 may determine the network services available to a potential customer of the network and may generate a plan to provide the services to the customer's location.

Thus, the visualization tool 200 brings together telecommunication network information from various databases and provides an interface through which the information may be viewed and used to determine available services. To aid the user in understanding and viewing the information, the visualization tool 200 includes many features to view and manipulate the gathered information. FIGS. 4-17 illustrate screenshots for the various features available through the user interface of the visualization tool 200. Each of the screenshots of FIGS. 4-17 may include a map portion illustrating a geographical region of a map. For example, the screenshot 400 of FIG. 4 includes a map portion 405, in this example illustrating the United States. The map shown 405 may be received as an external data source 302 from an external database 304. In one particular example, the external data source 302 may be publicly available map source accessible through one or more websites of the Internet. Thus, the external data source database 304 may be one or more servers accessible through an Internet Protocol (IP) address and a web browser.

The user interface 400 includes one or more toggle switches 402 along the top of the interface. The toggle switches 402 allow a user of the interface 400 to view information associated with the box and labeled. In the example shown, several toggle switches 402 are selected such that information related to each switch is illustrated in the map portion 405 of the interface 400. In particular, a footprint of fiber lines for a telecommunications network is shown, with other network information such as MSO regions, CLEC regions, network-to-network interface (NNI) locations, Serving Wire Center (SWC) boundaries, Local Access Transport Area (LATA) boundaries, 911 Public-Safety Access Point (PSAP) locations, rate center boundaries, and additional network related information not shown. Such information may be obtained from internal data sources 306 stored in the internal database 308 and network information 310 stored in a network-maintained database 312. For example, the information defining the MSO regions and CLEC regions illustrated in the map 405 may obtained from an internal database 308 that stores the region information 306, while the fiber footprint for the network may be stored in the network-maintained database 312. Regardless of which database stores the information, by selecting the view particular information through the operation of one or more toggle switches 402, the visualization tool 200 obtains the information from a database for inclusion in the user interface.

The user interface 400 may also include a search function 404 that a user may use to tailor the region illustrated in the map portion 405 of the interface. The search function 404 allows the user to search a map region based on the available MSOs, a state, a county, and/or a particular address. Further, although illustrated in particular locations within the user interface, it should be appreciated that any of the features of the visualization tool 200 may be located and/or oriented anywhere within the interface.

Figure 4:
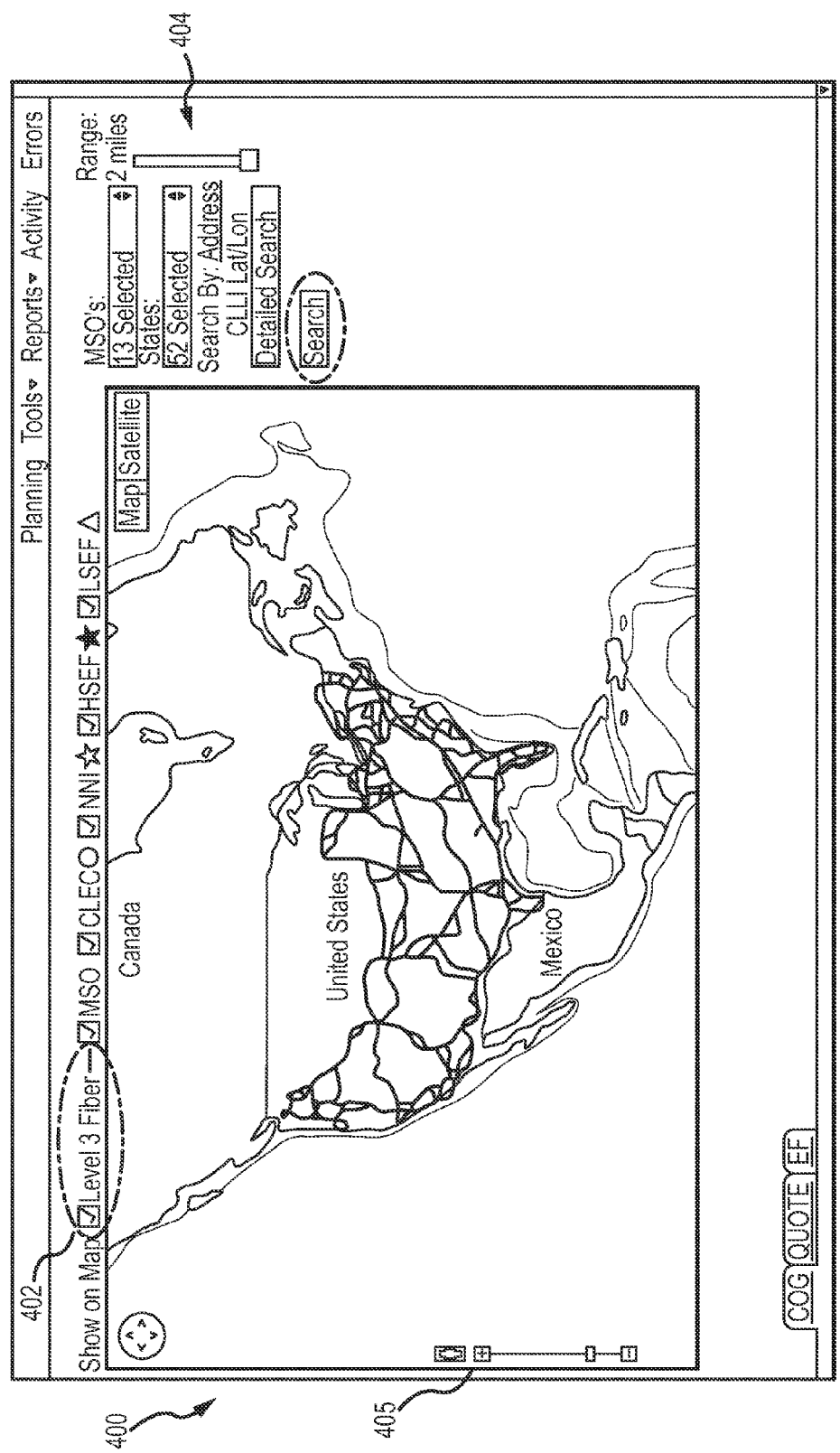
FIG. 4 is screenshot of a visualization tool illustrating a fiber footprint of a telecommunications network in a map portion of a user interface.
Figure 5:
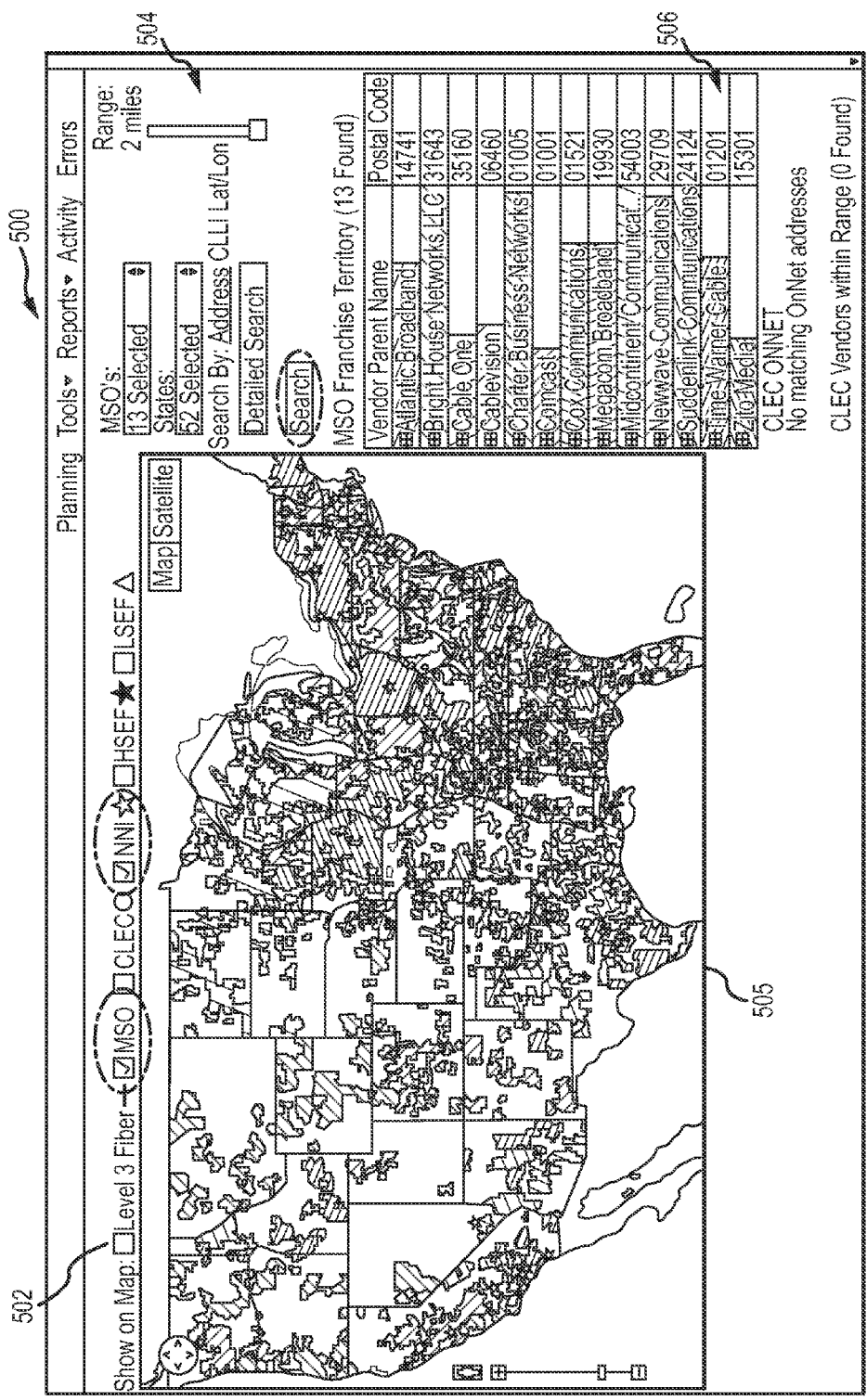
FIG. 5 is screenshot of a visualization tool illustrating Multiple System Operator regions in a map portion of a user interface.

As shown in the map portion 405 of FIG. 4, a fiber footprint for a particular telecommunications network is illustrated. Thus, by viewing the map region 405 of the visualization tool 200, a user may gain a sense of the fiber paths of the network. Similarly, FIG. 5 is a screenshot of the visualization tool 200 illustrating MSO regions and NNI locations in the map portion 505 of a user interface 500. To obtain this view in the user interface 500, a user selects the toggle switches 502 for "MSO" and "NNI". In one implementation, the MSO regions are illustrated in the map 505 using different colors to differentiate between the MSO regions. In another implementation, the MSO regions are illustrated in the map 505 portion of the visualization tool 200 using different hatching techniques to distinguish the boundaries. For example, one MSO region may be shown in the map portion 505 utilizing a cross-hatching section in the map while another MSO region may be shown utilizing a group of parallel diagonal lines in the region. Further, in one implementation, the NNI locations are illustrated in the map 505 as stars. In general, the MSO regions and NNI locations may be illustrated through any identifiable indicator.

To aid in distinguishing the different MSO regions illustrated in the map 505, a MSO key 506 may be generated and illustrated in the user interface 500. The MSO key 506 includes a listing of the various MSOs illustrated in the map portion 505 and illustrates the name in a particular color or associates the name with a particular hatching technique. The color or hatching technique associated with the name of the MSO in the key 506 is used in the map to distinguish MSO regions. The key 506 may provide other information concerning the MSOs, such as the postal regions of the MSOs and the number of MSOs shown in the map 505.

The information used to populate the MSO regions in the map 505 may be obtained from a vendor reference table stored in the internal database 308. Changes made to the database may then be propagated to the visualization tool 200 upon retrieval of the MSO region information 306. The NNI locations may be obtained from a table or list 310 stored in the network-maintained database 312 or the internal database 308.

Figure 6:
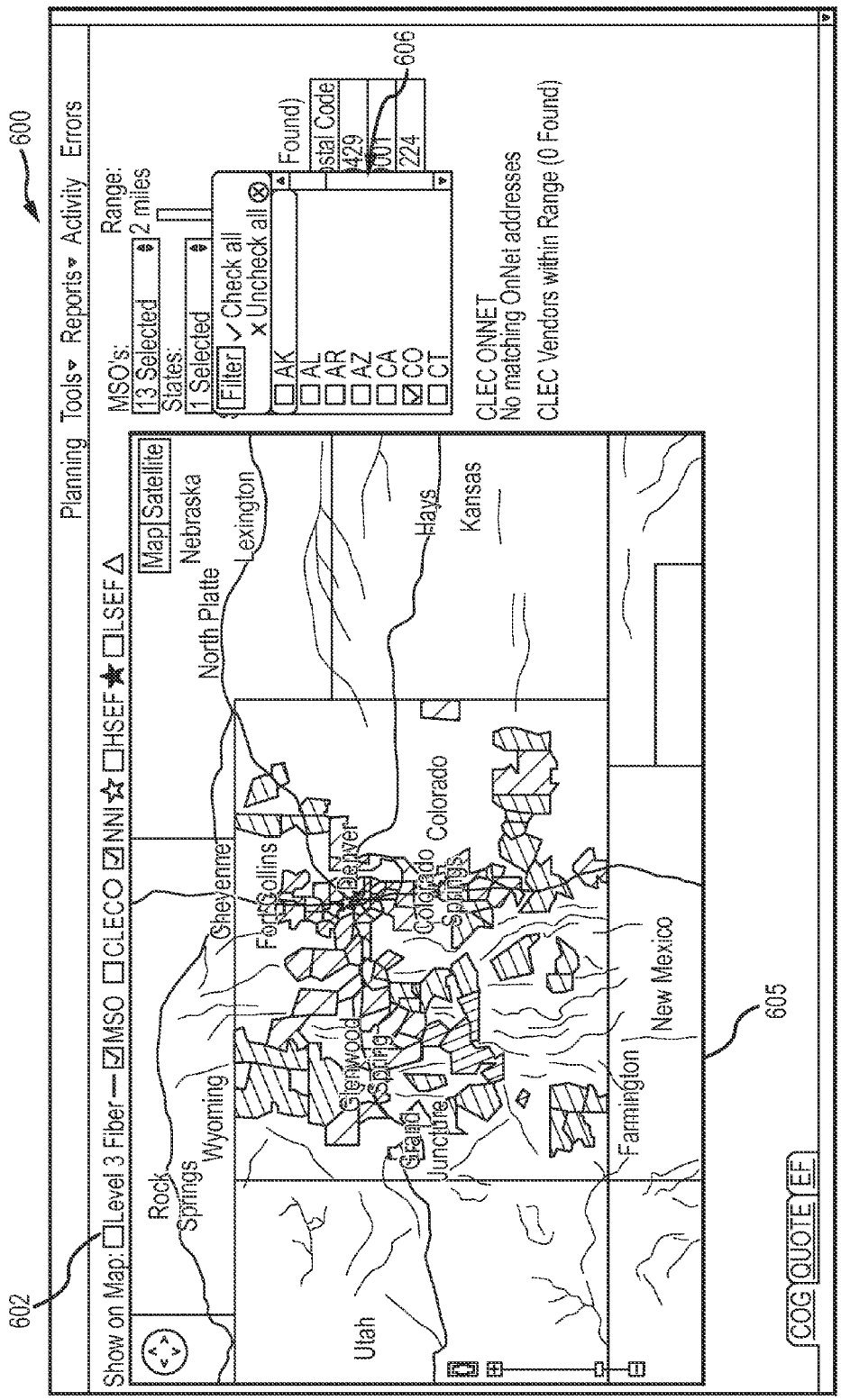
FIG. 6 is screenshot of the visualization tool illustrating Multiple System Operator regions in a map of a state illustrated in a user interface.
Figure 7:
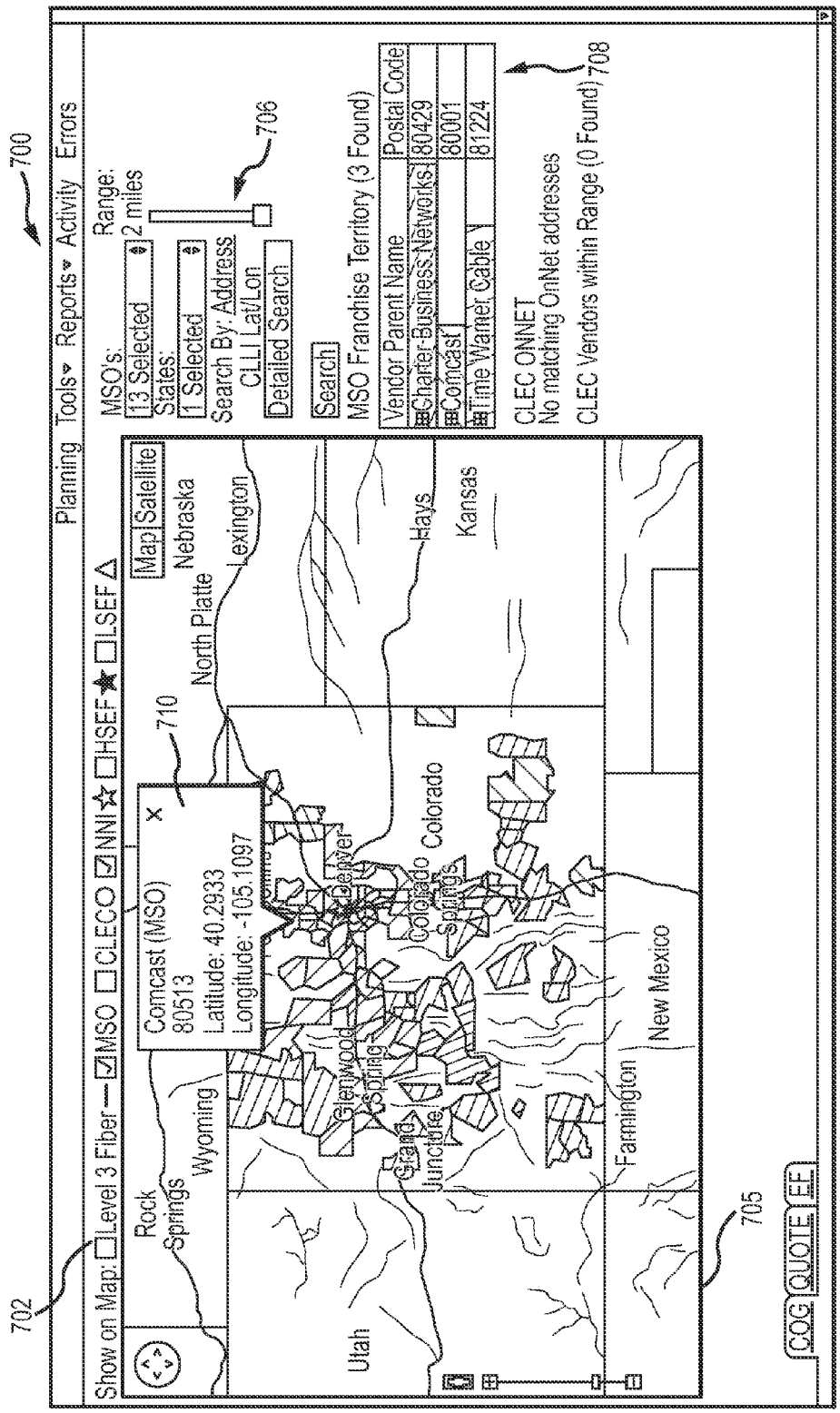
FIG. 7 is a screenshot of the visualization tool illustrating Multiple System Operator regions in a map of a state and a Multiple System Operator information box illustrated in a user interface.

The screenshot 500 of FIG. 5 illustrates the MSO regions and NNI locations nationwide. However, a smaller map range may be obtained and shown in the user interface. For example, FIG. 6 is screenshot of the visualization tool 600 illustrating MSO regions and NNI locations in the map of a state 605 illustrated in the user interface. In particular, the map range shown in the map portion 605 of the interface 600 is for Colorado. A user of the user interface 600 may select the state from a dropdown menu in the search 606 portion of the interface. In one implementation, more than one state may be selected and viewed at a time. The map region 605 includes the MSO regions (color-coded or hatched as described above) and the NNI locations within the selected map region. In addition to illustrating the MSO regions in the map 605, the interface 600 may also include additional information about a selected MSO in the map. For example, FIG. 7 is a similar screenshot as illustrated in FIG. 6 illustrating the MSO regions for the state of Colorado in the map portion 705. However, in this implementation, the map portion 705 further includes an information box 710. The information box 710 contains information concerning an illustrated MSO in the map region 705. For example, the information box 710 includes the MSO name, a postal region for the MSO, and a particular latitude and longitude. To generate the MSO information box 710, a user of the interface 700 selects a point within the map region 705 (or enters a search query into the search portion 706) with an input device to the visualization tool 200. When the location is selected, the visualization tool 200 determines the latitude and longitude coordinates of the selected location, the associated postal code for the location, and the MSO that provides services to that location and portrays such information in the MSO information box 710. Other information that may be shown in the MSO information box 710 (or another place in the user interface 700) includes the MSO NNI capacity and vendor contact information, among others.

Figure 8:
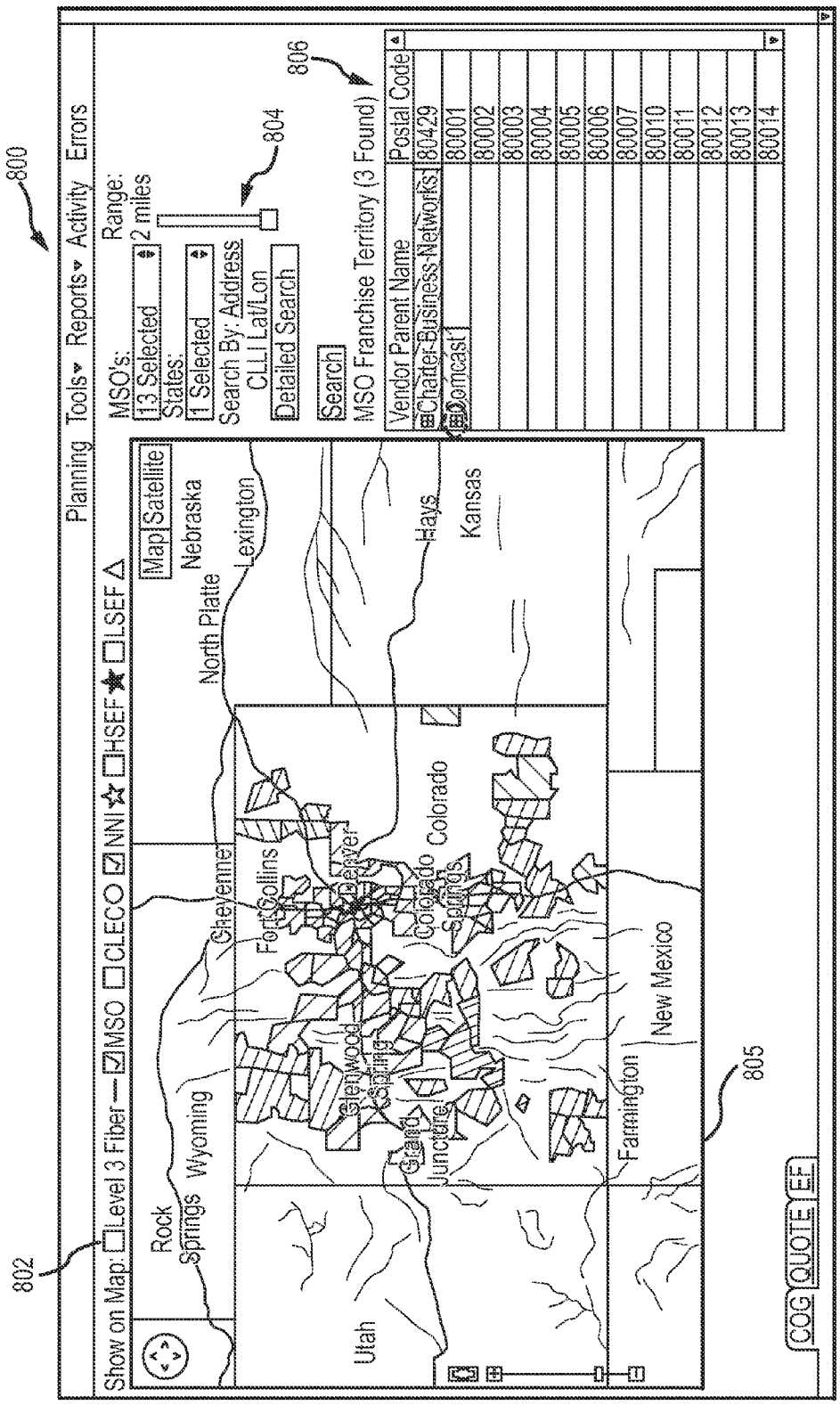
FIG. 8 is a screenshot of a visualization tool user interface illustrating each postal code to which a selected Multiple System Operator is associated.

The MSO information illustrated in the user interface 700 is based on postal codes. In particular, an MSO may be assigned or otherwise associated with one or more postal codes within the region illustrated by the map 705 such that the boundaries of the postal codes define the boundaries of the illustrated MSOs. Each of the postal codes associated with an MSO in the map 705 may be obtained by clicking on the plus symbol next to a particular MSO in the list of MSOs 708. For example, FIG. 8 is a screenshot 800 of a visualization tool user interface illustrating each postal code to which a selected MSO is associated in a MSO listing 808. In the particular example shown, a user selects the plus symbol next to a name of an MSO in the MSO listing 808. Each postal code in the region selected in the map portion 805 is then listed that is associated with the selected MSO. In this manner, a user may determine which particular postal codes of the map region 805 are associated with a selected MSO.

Figure 9:
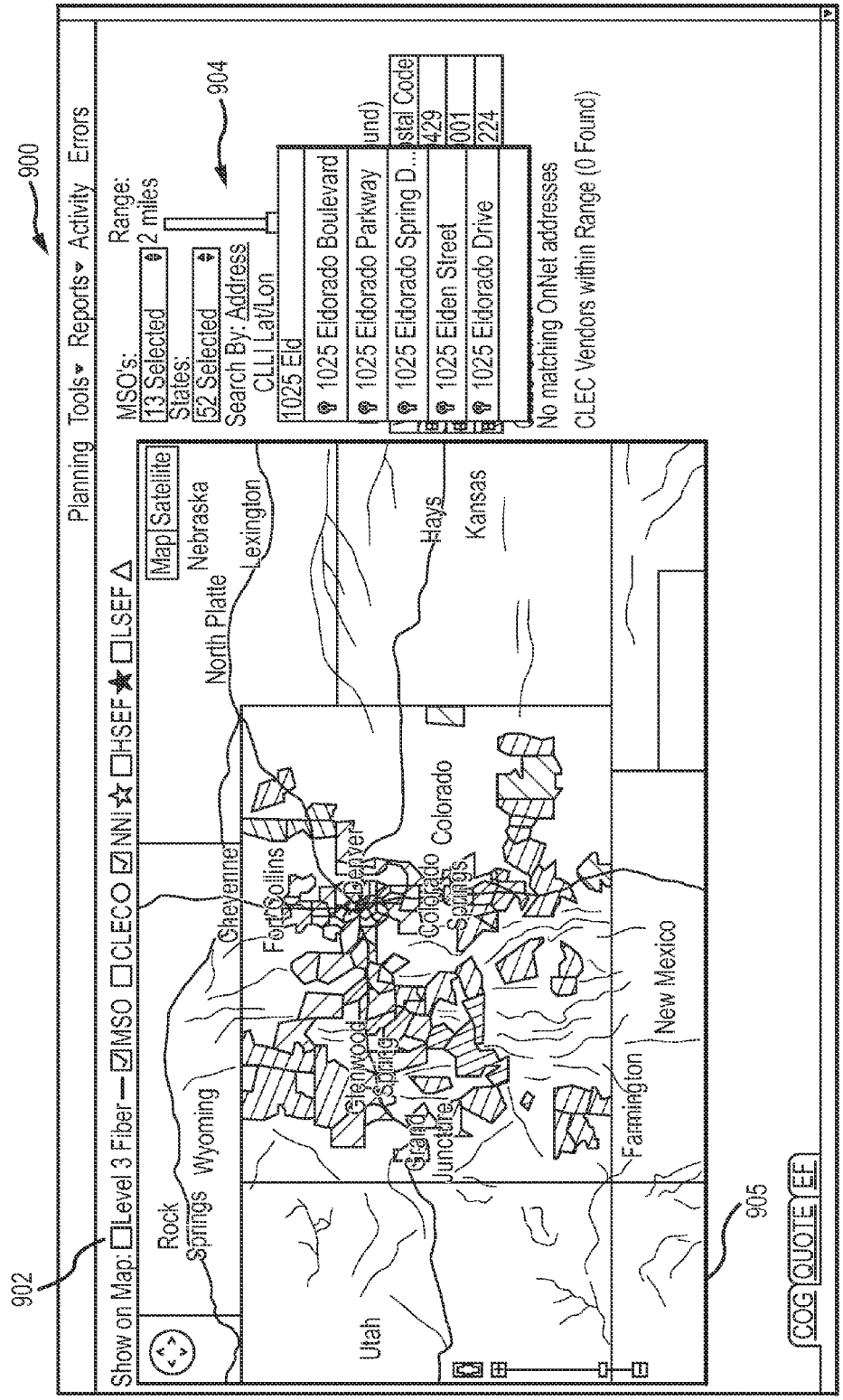
FIG. 9 is a screenshot of a visualization tool illustrating entering an address into a search portion of a user interface.
Figure 10A:
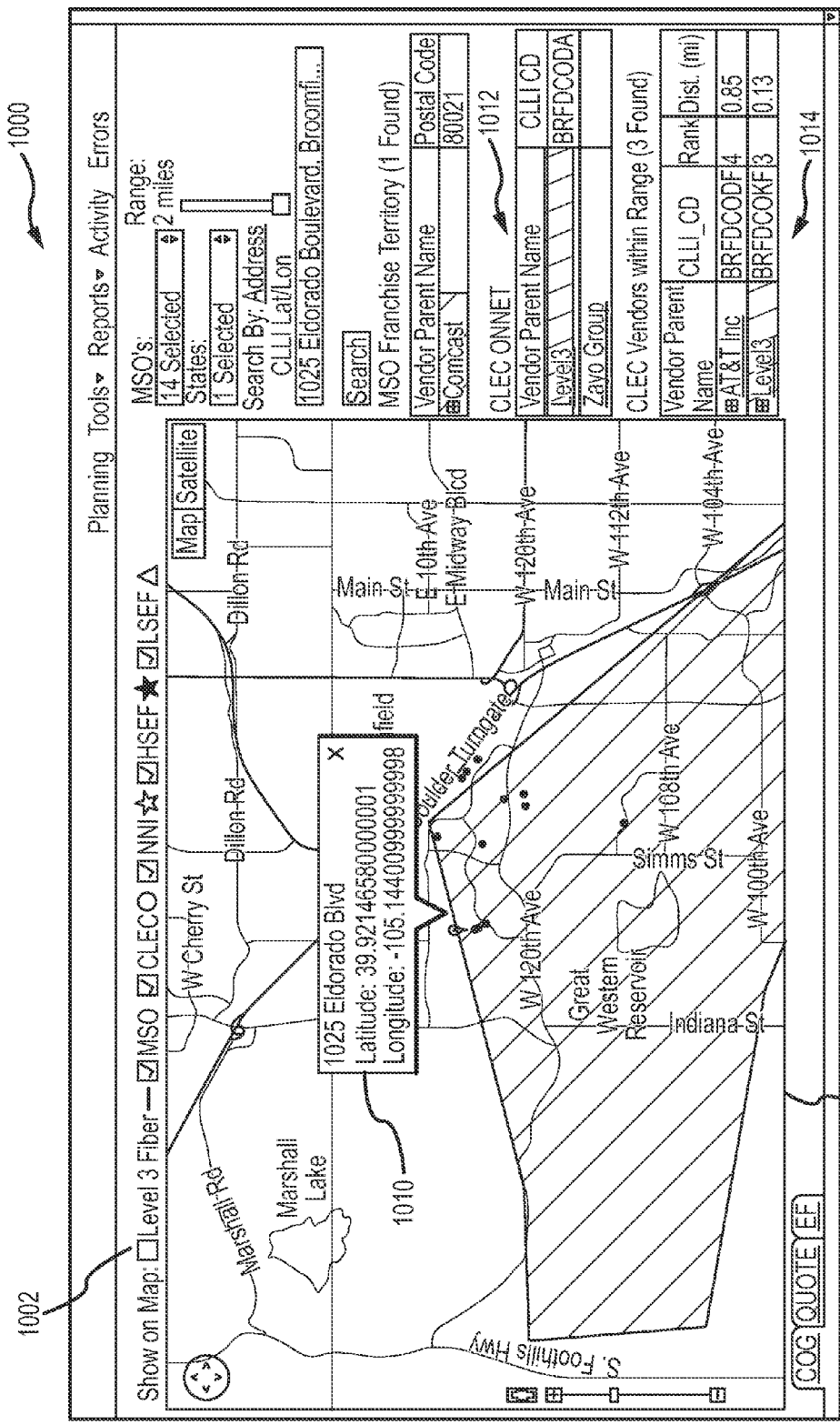
FIG. 10A is a screenshot of a visualization tool illustrating a map portion around a searched for address.

As mentioned, the region illustrated in the map portion 805 may be searchable or configurable around a physical address. FIG. 9 is a screenshot 900 of a visualization tool illustrating entering an address into a search portion 906 of a user interface. Upon entering the address, the region illustrated in the map portion 905 is altered to zoom in on the entered address. In particular, FIG. 10A is a screenshot 1000 of a visualization tool illustrating a map portion 1005 around a searched for address. In particular, the area illustrated in the map portion 1005 is within a particular range from the entered location. In one embodiment, the map 1005 may show twenty miles around the entered location. Further, the entered location may be illustrated in the map portion 1005 with a pin and location information box 1010. The location information box 1010 may also include the address and latitude and longitude coordinates of the entered location.

Figure 10B:
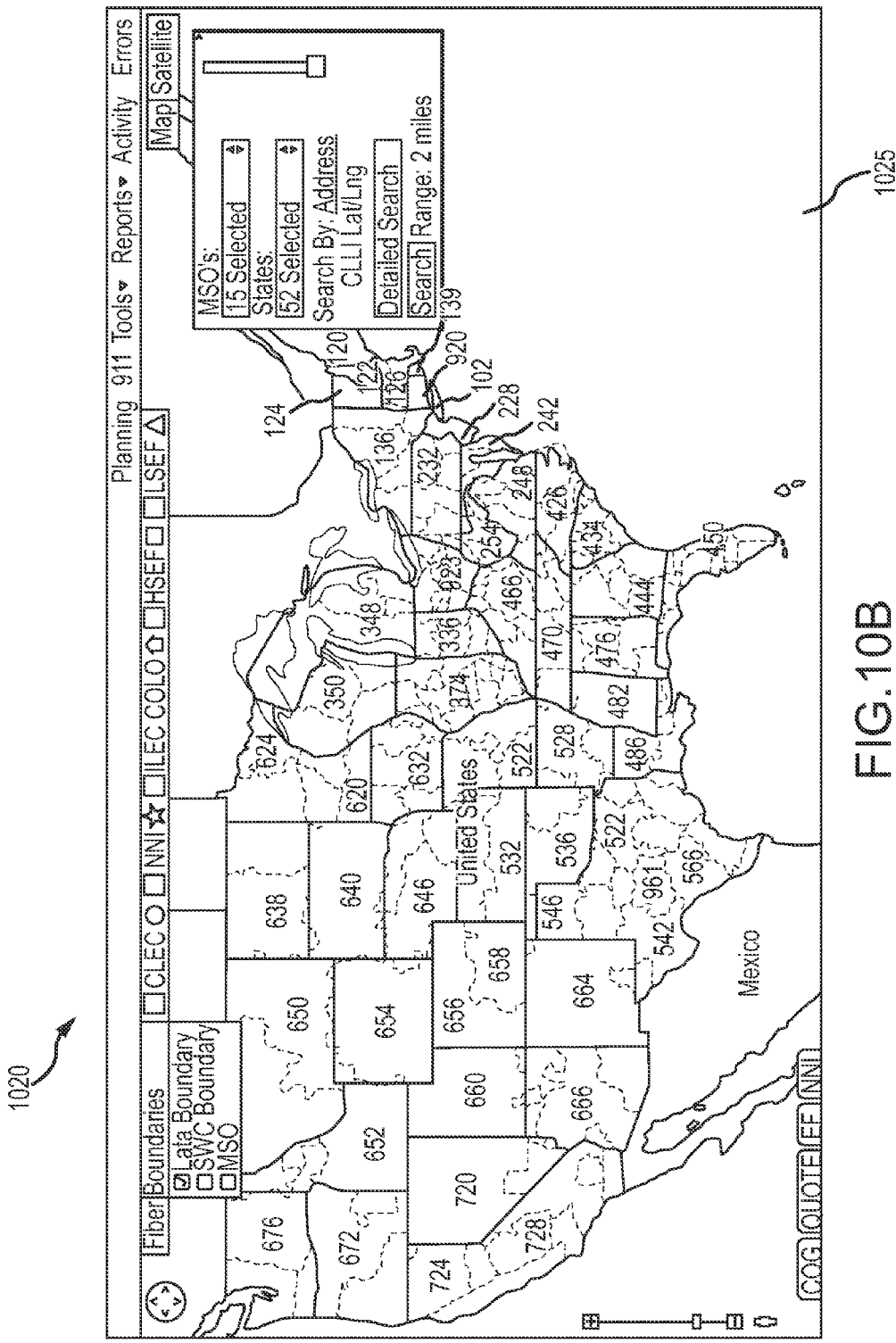
FIG. 10B is a screenshot of a visualization tool illustrating a map portion with Local Access Transport Area boundaries for a region.

The map portion 1005 of the visualization tool 200 in FIG. 10A includes a highlighted portion illustrating the particular MSO for the selected location. However, as discussed above, other boundaries may be illustrated in the map portion 1005 of the visualization tool 200. For example, FIG. 10B is a screenshot 1020 of a visualization tool illustrating a map portion 1025 with Local Access Transport Area (LATA) boundaries for a region. In particular, the map portion 1025 illustrates the continental United States and the LATA boundaries for the region. LATA boundaries are typically used by telecommunications companies to define zoning for Incumbent Local Exchange Carrier (ILEC) vendor areas. These LATA boundaries are illustrated in the map portion 1025 for understanding and viewing by a user of the visualization tool 200.

Figure 10C:
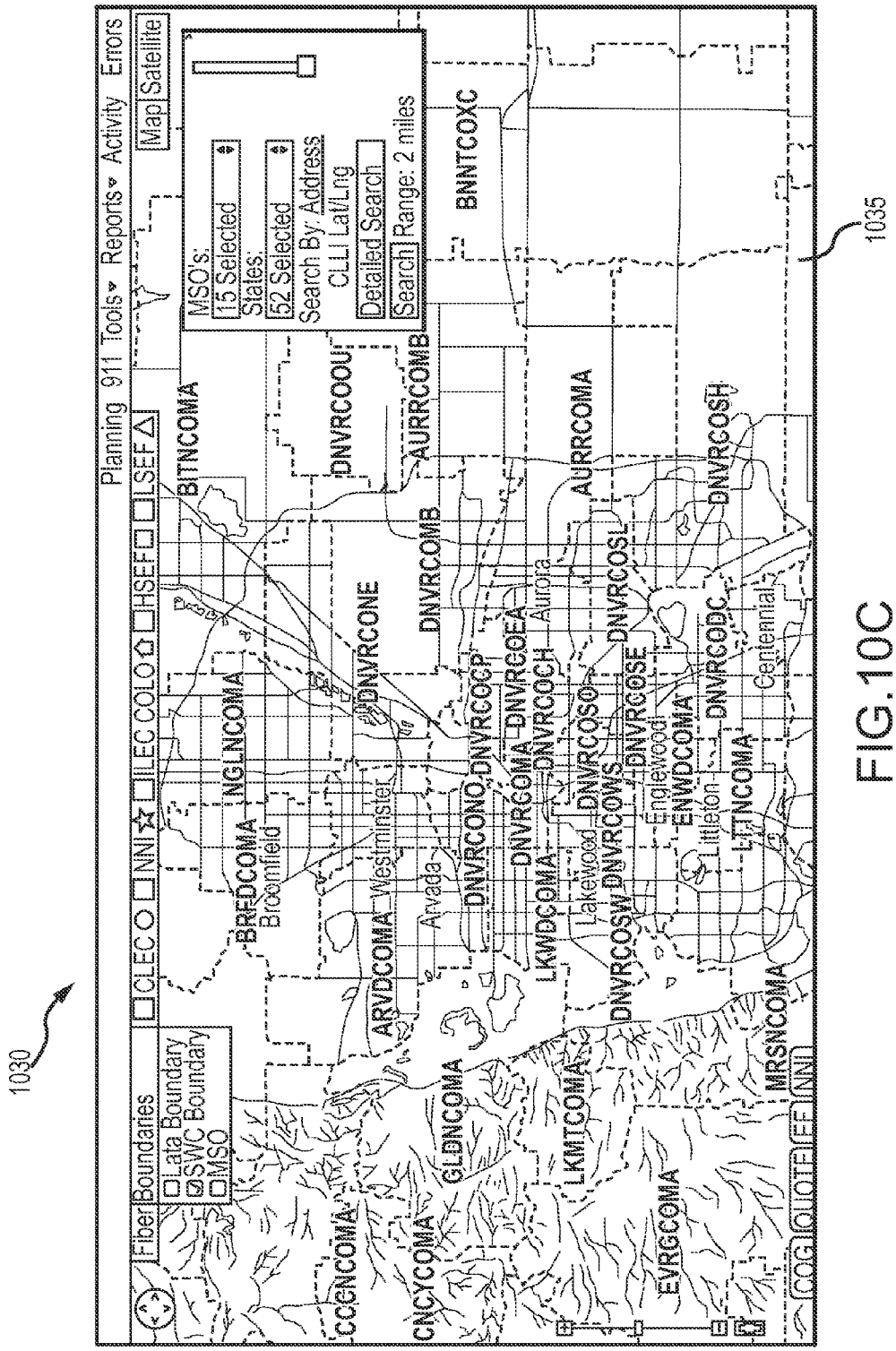
FIG. 10C is a screenshot of a visualization tool illustrating a map portion with Serving Wire Center boundaries for a region.

Yet another alternative boundary set for the map portion of the visualization tool 200 is illustrated in FIG. 10C. In particular, FIG. 10C is a screenshot 1030 of a visualization tool illustrating a map portion 1035 with Serving Wire Center (SWC) boundaries for a region. In particular, the map portion 1035 illustrates the region around Denver, Colo. and the SWC boundaries for the region. SWC boundaries are typically used by telecommunications companies to define SWC for ILEC vendor areas. Many last-mile services provided via a CLEC to a service location will be homed from the supporting SWC for a particular area. These SWC boundaries are illustrated in the map portion 1035 for understanding and viewing by a user of the visualization tool 200.

Figure 10D:
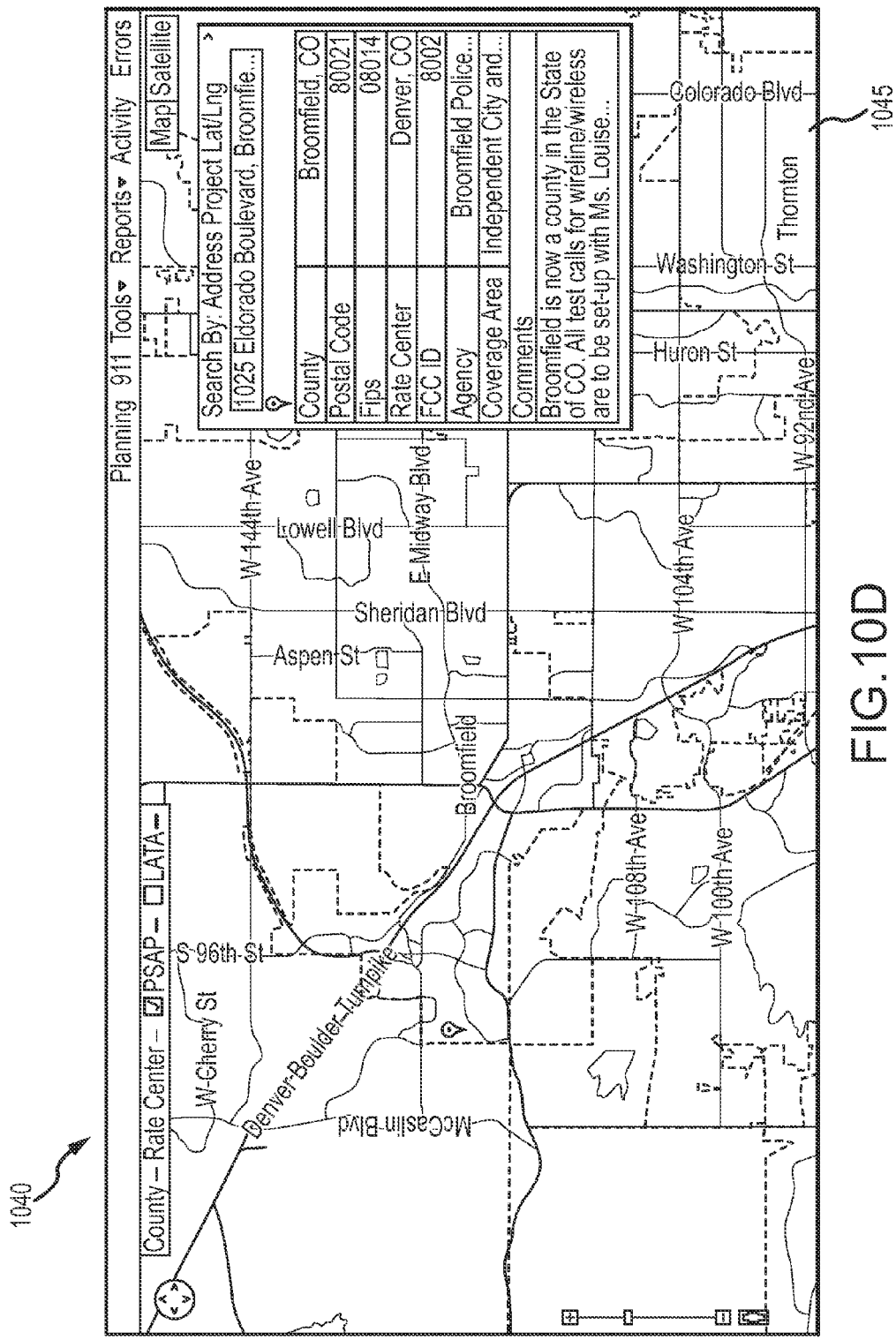
FIG. 10D is a screenshot of a visualization tool illustrating a map portion with Public Safety Access Point boundaries for a region.

Still another alternative boundary set for the map portion of the visualization tool 200 is illustrated in FIG. 10D. In particular, FIG. 10D is a screenshot 1040 of a visualization tool illustrating a map portion 1045 with Public Safety Access Point (PSAP) boundaries for a region. In particular, the map portion 1045 illustrates the region around the provided address and the PSAP boundaries for the region. PSAP boundaries are typically where 911 emergency calls are zoned and routed. These PSAP boundaries are illustrated in the map portion 1045 for understanding and viewing by a user of the visualization tool 200.

Returning to FIG. 10A, additional information may also be illustrated in the map 1005. For example, Competitive Local Exchange Carrier (CLEC) buildings may be illustrated in the map is the CLEC toggle switch 1002 is turned on. In the example shown in FIG. 10A, the CLEC buildings are indicated by dots within the map 1005. In addition, the CLEC buildings in the area may be listed along the side of the map 1005 in the user interface 1000. In one embodiment, the CLEC buildings in the map region 1005 are listed as CLEC buildings in the same location 1012 (such as in the same postal code area as the entered location) and CLEC buildings nearby 1014 the entered location. To obtain the CLEC buildings nearby 1014, the visualization tool 200 may determine a particular range (such as three miles) from the entered location to limit the number of CLEC buildings listed in the CLEC buildings nearby list. In addition, an MSO boundary for the entered location may be highlighted or filled in over the postal code of the entered location. The MSO boundary area may be toggled on and off through the related toggle switch in the user interface.

Figure 11:
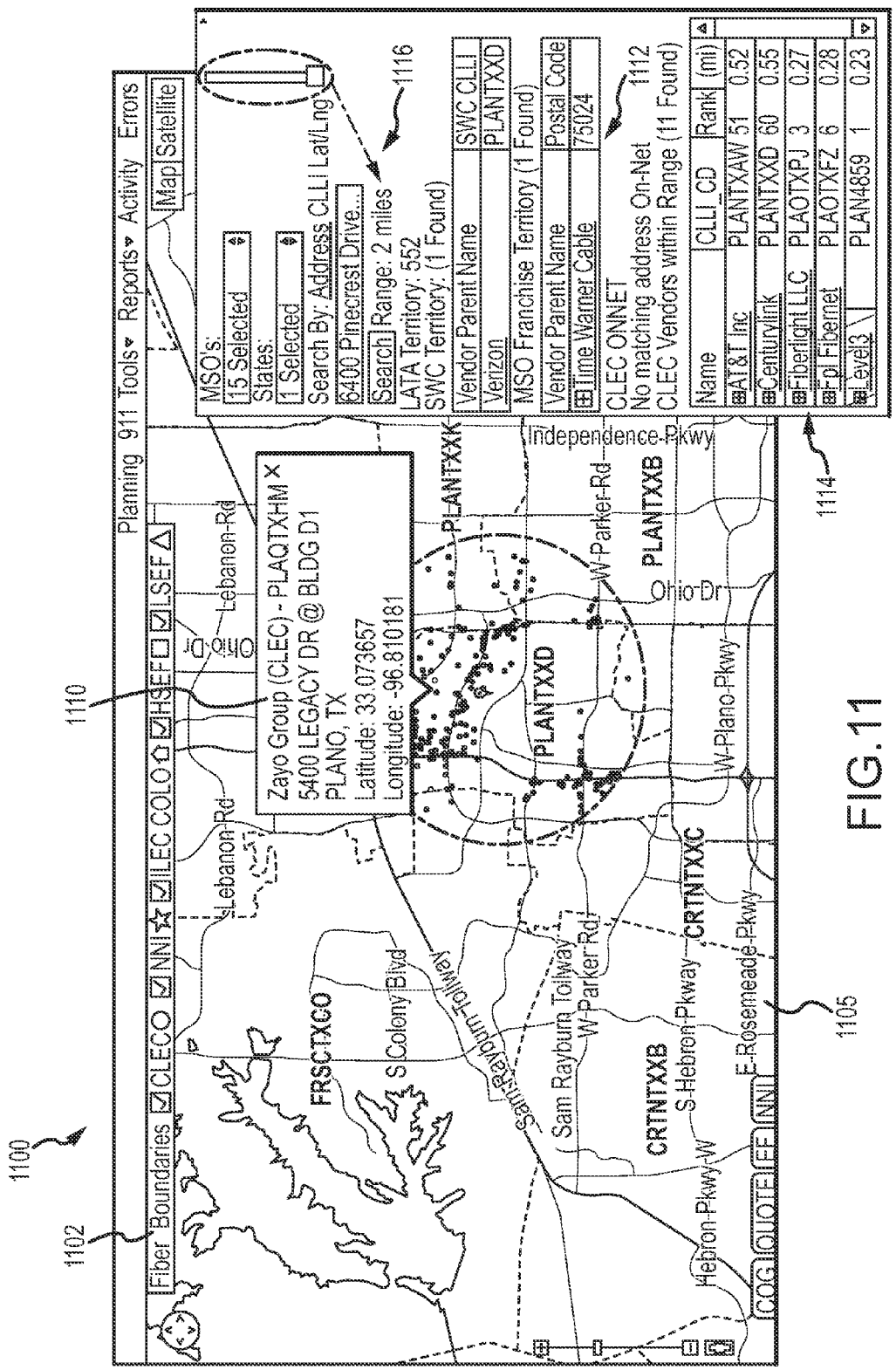
FIG. 11 is a screenshot of a visualization tool illustrating a map portion around a searched for address including a CLEC building information box

Similar to the MSO information box, a CLEC information box may also be accessed through the map 1005. FIG. 11 is a screenshot 1100 of a visualization tool illustrating a map portion 1105 around a searched for address including a CLEC building information box 1110. The CLEC information box 1110 may include any type of CLEC information, such as the name of the CLEC associated with the building, a CLEC building identification code (such as a CLLI code), an address of the building, latitude and longitude coordinates for the building, and the like. In general, the information associated with a CLEC building may be stored in and obtained from the internal database 308 by the visualization tool 200. Also, the range 1116 from which to display items from the centered entered location may be adjusted by a user of the visualization tool 200.

Figure 12:
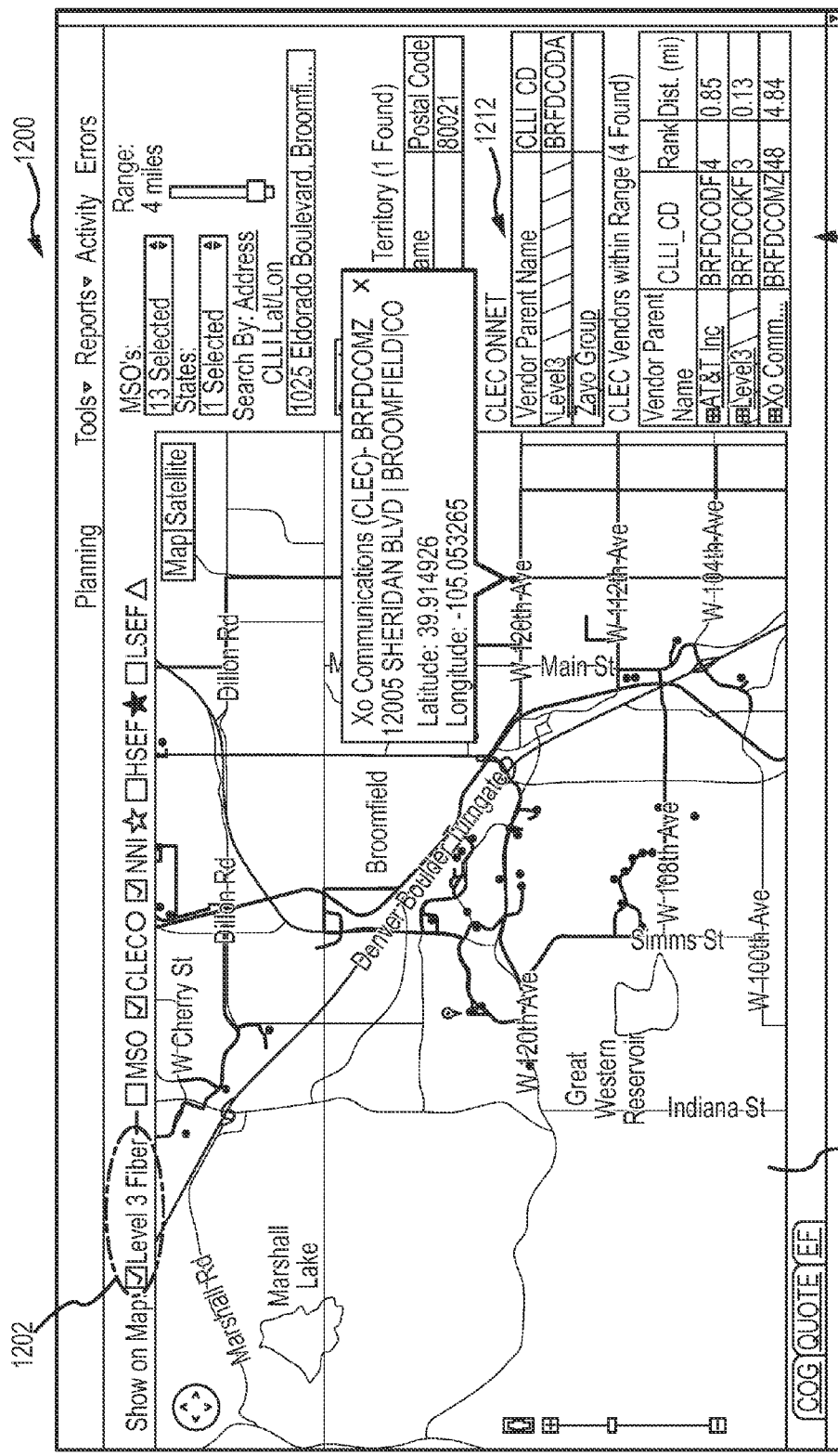
FIG. 12 is a screenshot of a visualization tool illustrating a map portion around a searched for address including a telecommunications network fiber footprint.

As mentioned above, the user interface 1100 may be utilized to illustrate a fiber footprint for a telecommunications network. For example, FIG. 12 is a screenshot 1200 of a visualization tool illustrating a map portion 1205 around a searched for address including a telecommunications network fiber footprint. The fiber footprint may include any communication line information about the network, including local fiber lines and long distance fiber lines. Such information may be included in the map portion 1205 by toggling the toggle switch for the fiber footprint. With this information, a user of the visualization tool 200 may visually determine the available connections to a site to aid in estimating a cost for connecting a potential customer to one of the existing fibers of the network. For example, a location in the map 1205 may be highlighted or selected by the user, such as the building illustrated in FIG. 12 with the building information box. Visually, a user of the visualization tool 200 may determine that the building is located near an existing fiber of the network. Thus, connecting a customer in that building to the network may not require the addition of more fiber lines to the network. However, for those customers not near a fiber line of the network, a new fiber line may be installed to provide customers in that building fiber related services. In one implementation, the user interface 1200 may include an indication of the distance to one or more fibers from the entered location, such as the distance in miles and/or feet to the nearest fiber and other selected fiber lines. In this manner, a user of the visualization tool 200 may quickly determine the cost to provide fiber services to a potential customer based on the customer's location.

Figure 13:
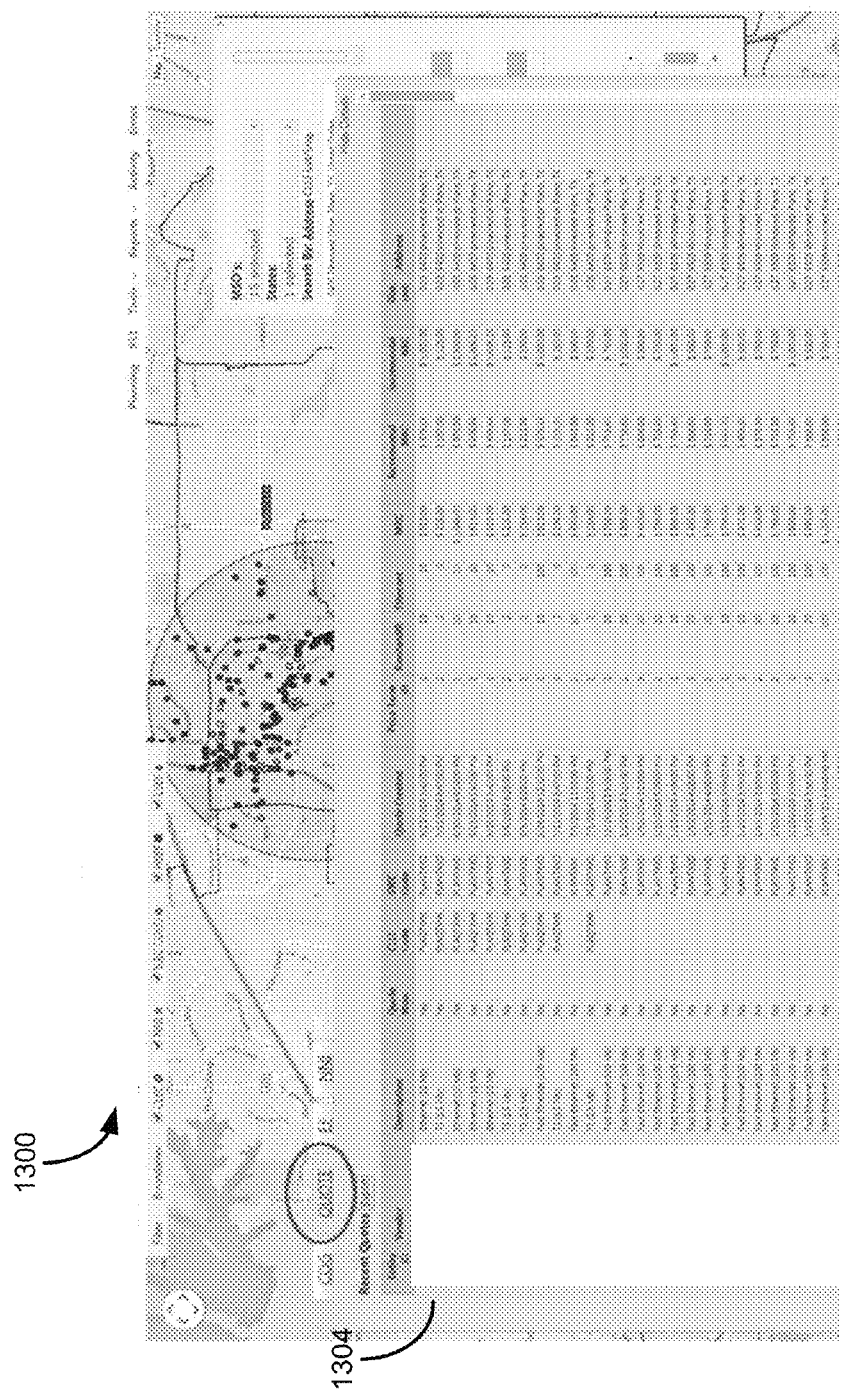
FIG. 13 is a screenshot of a visualization tool illustrating a prior quote information sheet accessible through a tab on the user interface.

Once the location for adding a telecommunications service is selected, the visualization tool 200 may provide information to further aid the system in determining how to provide the service to the requesting customer. In one embodiment, the visualization tool 200 may include a prior quote information sheet available through the user interface. In particular, FIG. 13 is a screenshot 1300 of a visualization tool illustrating a prior quote information sheet 1304 accessible through a tab on the user interface 1302. In one implementation, the prior quote information sheet 1304 is available to the user by clicking on the "QUOTE" tab in the user interface 1302. The information included in the prior quote information sheet 1304 may include quotes for providing a similar service as the requested service to a customer of the network. The information may be limited, in some instances, to the entered location for the service and an adjustable range around the entered location. The information may further be limited to a period of time in the past, such as the past year or past month. Such information may be obtained from the network-maintained database 312 by the visualization tool 200. A user of the visualization tool may utilize the prior quote information sheet 1304 to obtain a quick reference of past services provided and costs per bandwidth associated with providing the services to the prior requesting customers for assessment of Market Pricing data for the selected region.

Figure 14A:
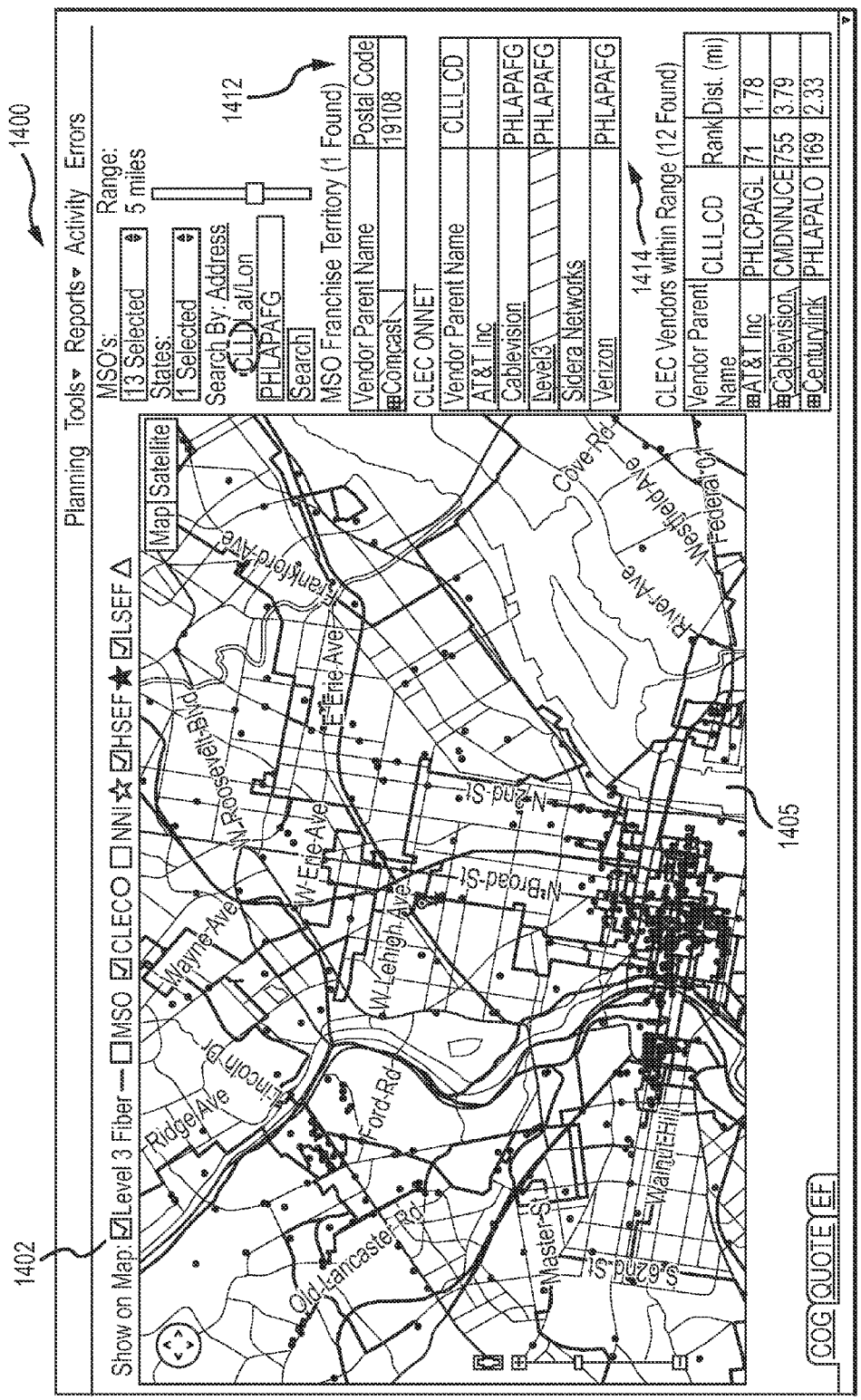
FIG. 14A is a screenshot of a visualization tool illustrating a map portion including routes and other roads.
Figure 14B:
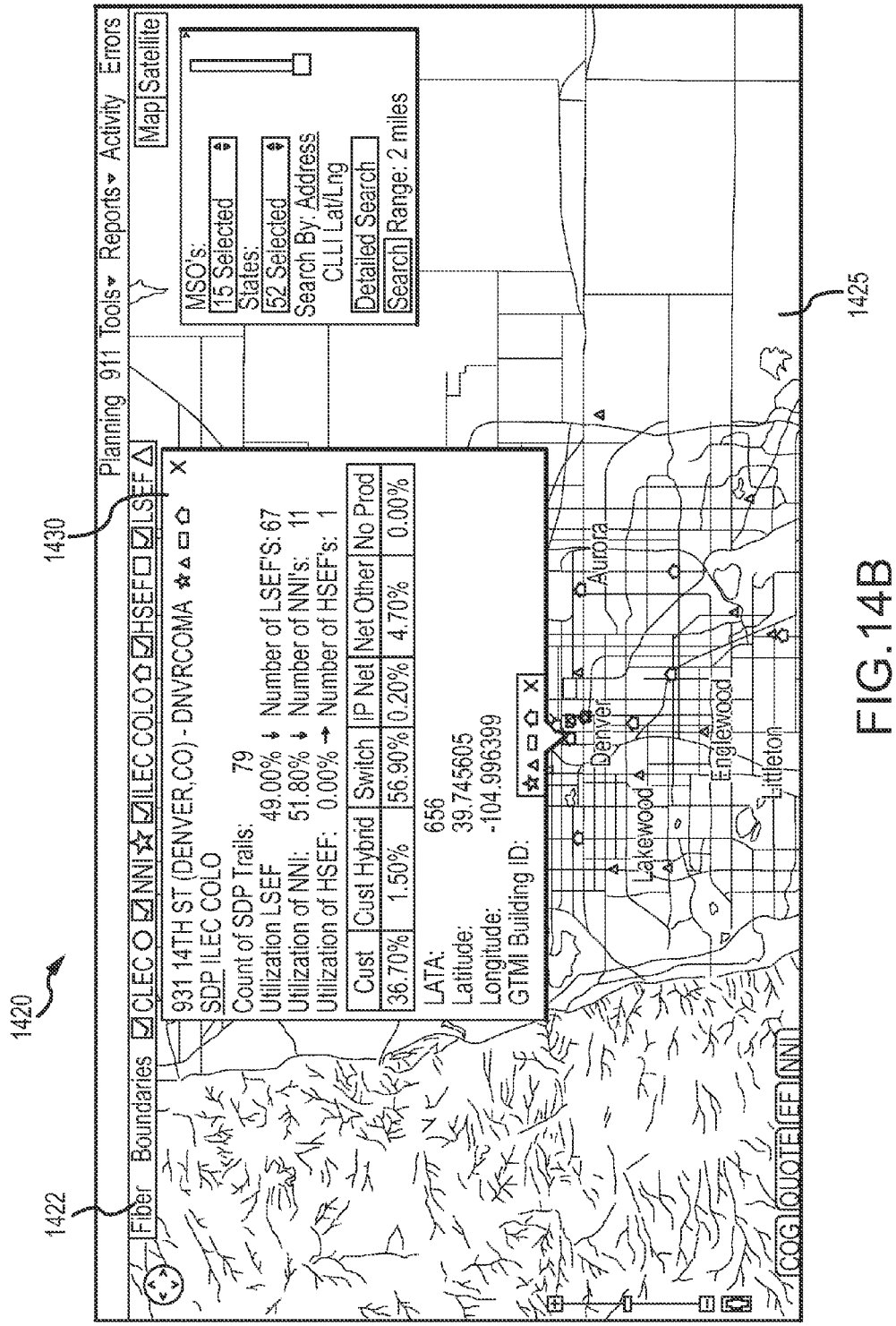
FIG. 14B is a screenshot of a visualization tool illustrating a map portion including roads and terrain.

The type of map illustrated in the map portion of the user interface is also configurable by the user. For example, FIG. 14A is a screenshot 1400 of a visualization tool illustrating a map portion including routes and other roads. The previous map portions described above include a satellite view of the selected area or location. In contrast, the map portion 1405 of FIG. 14A is a map that includes the streets and roads of the selected area. Another map view may include terrain in the illustrated map. Such views may be toggled by the user of the visualization tool 200 through the user interface. For example, FIG. 14B is a screenshot 1420 of a visualization tool illustrating a map portion 1425 including roads and terrain. In addition, the screenshot 1420 of FIG. 14B illustrates a different information box 1430 than discussed above. In this view, the information box 1430 presents information for a particular service distribution point. In particular, the information box 1430 includes location information for the selected service distribution point, such as the address, CLLI code, LATA, latitude and longitude, and other geographical information for the selected site. Further, the information box 1430 may include traffic information for the selected site. In the example shown, a percentage of the total capacity utilized to provide services to particular users of the site is illustrated. Such capacity percentages may be provided for the capacity of the site utilized by customers, switches, IP services, and the like. Other site information may include the utilization of components for the EFs and NNI connections to the site and a general trend for providing those connections at the site, along with direct links to detailed display for the selected portion of the information. In general, any information concerning the utilization and/or configuration of the selected service distribution point may be provided in the information box 1430.

Figure 15:
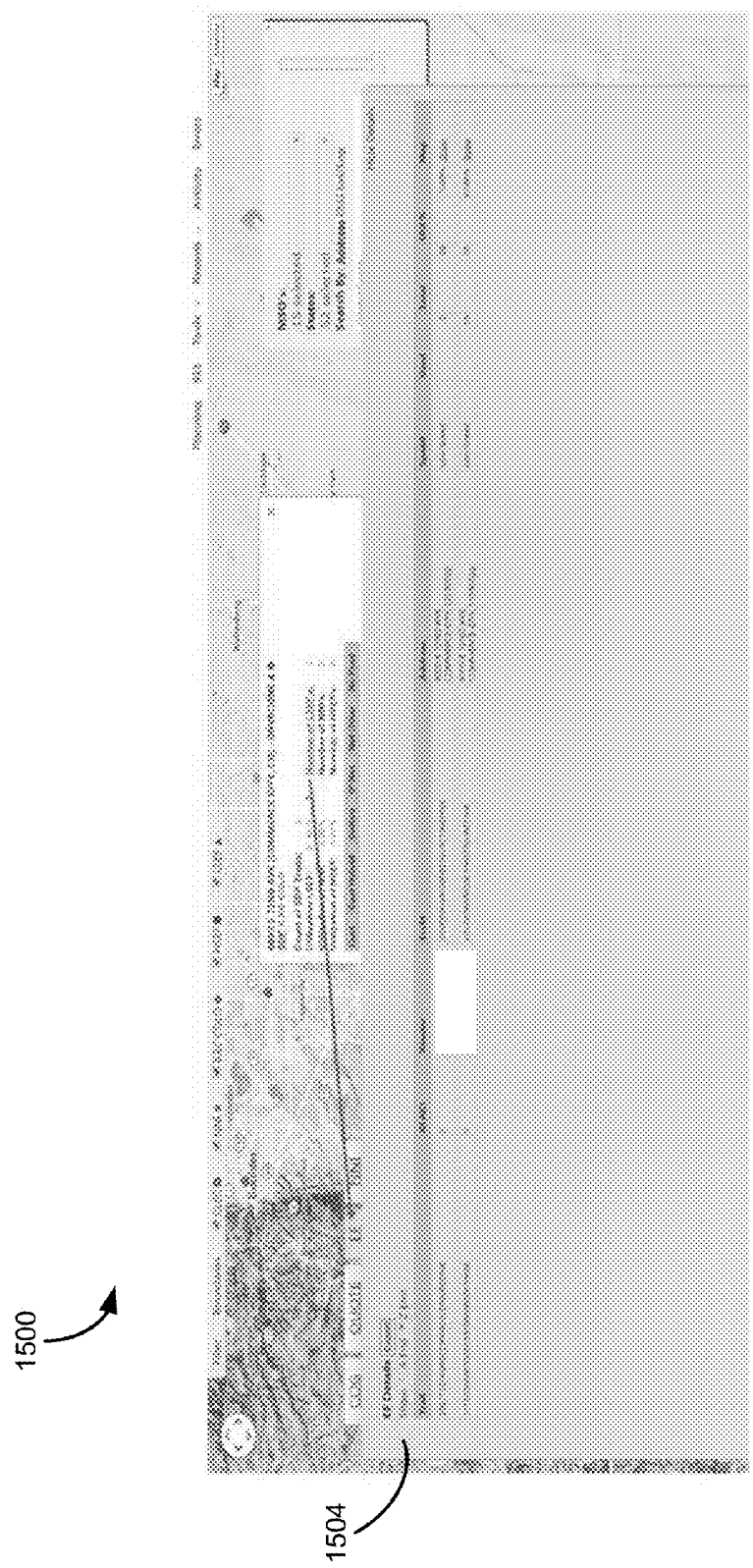
FIG. 15 is a screenshot of a visualization tool illustrating a shared entrance facility information sheet accessible through a tab or hyperlink on the user interface.

FIG. 15 is a screenshot of a visualization tool 200 illustrating a shared entrance facility information sheet accessible through a tab or hyperlink on the user interface. In the example shown, the entrance facility information sheet is accessed through a hyperlink included in the service distribution point information box 1430 of FIG. 14B. The entrance facility information sheet includes a summary of the shared Entrance Facility (EF) agreements a telecommunications network has with various local providers around the entered location. In one implementation, the EF information sheet 1504 is available to the user by clicking on the "EF" link in the information box. The EF information sheet 1504 may include the existing and ordered EFs the network has in place for the selected vendor. A similar NNI reference link in the information box may provide an NNI sheet that includes a reference to the internal identification for the NNI, an order number, the vendor's name, the NNI connection point, and a utilization percentage of the ordered connection. In general, however, any information concerning the agreements between the network and the selected vendor may be illustrated in the EF information sheet 1504 or the NNI information sheet. An account representative for the network and contact information for the representative may also be provided, in some embodiments. Further, the order of the listed agreements may be organized based on the distance from the entered location. With this information, a user of the visualization tool 200 may quickly determine an order history with the particular vendor to further estimate a cost for providing a telecommunication service to a potential customer.

Also mentioned above, the location entered into the visualization tool 200 may be a CLLI code. The map 1405 of the user interface 1400 of FIG. 14A is determined by the CLLI code entered into the search feature of the user interface. The geographic location of a CLLI code may be obtained from one or more location tables stored in the internal database 308 or databases by the visualization tool 200.

Figure 16:
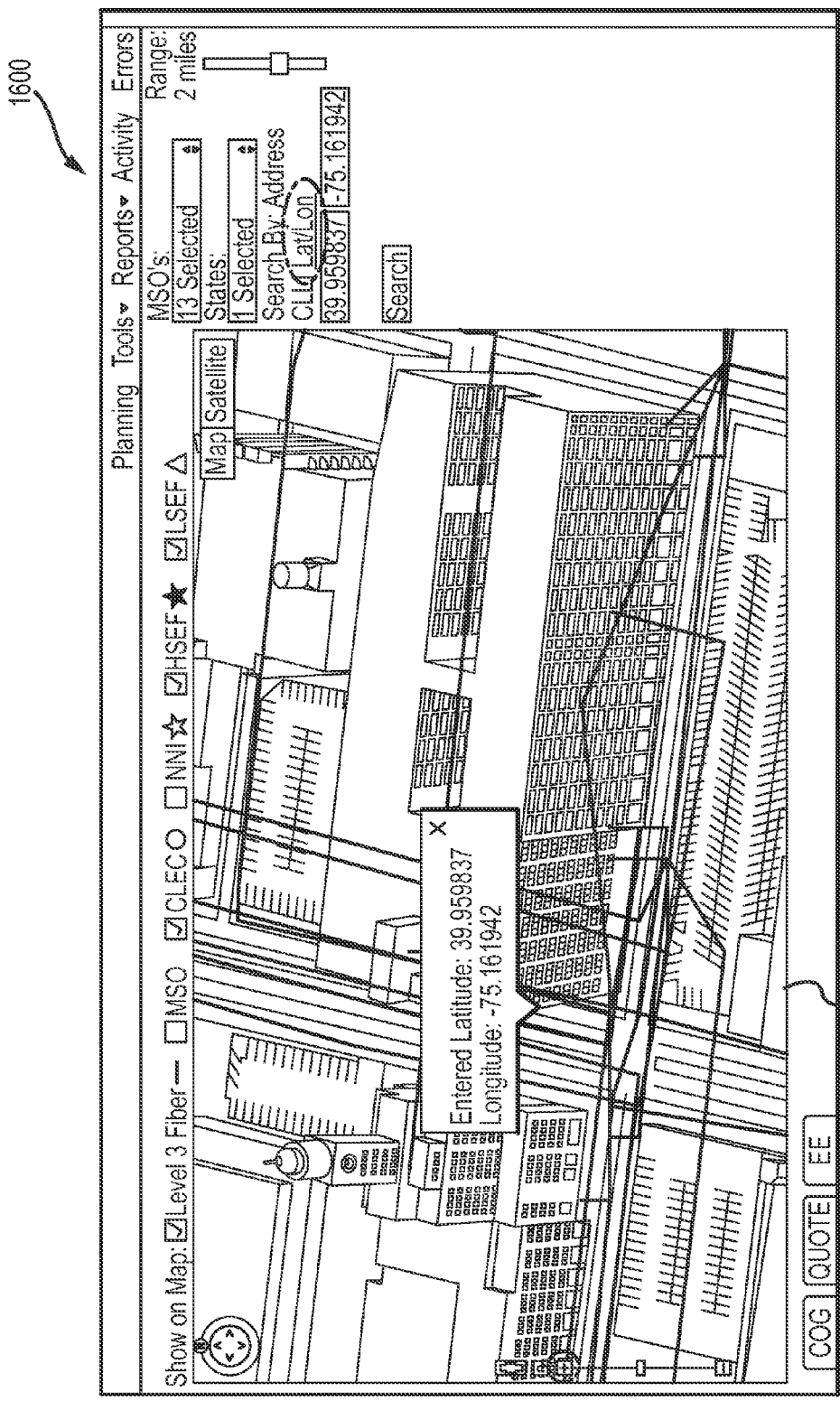
FIG. 16 is a screenshot of a visualization tool illustrating a map portion including a building level view.

Yet another view of the map portion of the visualization tool 200 includes a building level view. FIG. 16 is a screenshot of a visualization tool 1600 illustrating a map portion 1605 including a building level view. As such, the user interface may allow a user to zoom into the map 1605 to obtain the building view. Further, the fiber footprint may be selected and illustrate, in the map portion 1605, the number of fibers to the building for providing information on fiber services available at the viewed building.

Figure 17:
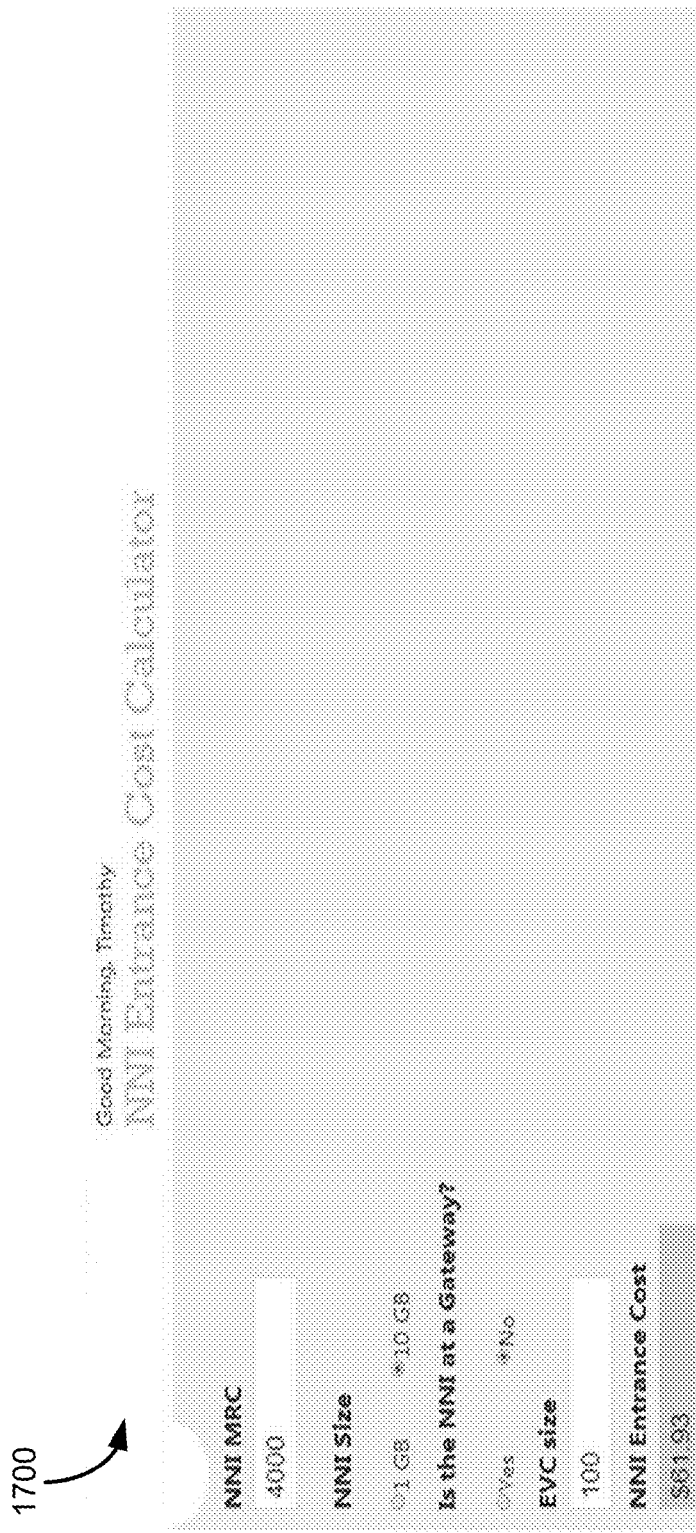
FIG. 17 is a screenshot of a visualization tool including an entrance cost calculator.

In one implementation of the visualization tool 200, a calculator feature may be included for estimating a cost for providing a telecommunication service to a potential customer. FIG. 17 is a screenshot of a visualization tool 200 including an entrance cost calculator 1700. In particular, the calculator 1700 illustrated is for determining an NNI entrance into the network for the customer. In general, the calculator 1700 may include one or more portions that allow a user to enter information concerning a telecommunications service and, with the entered information, provides an estimated cost to the customer for providing the service. In another implementation, the estimated cost may be automatically generated by the visualization tool 200 based on the requested service. This estimated cost may be provided to a network administrator or other network representative when communicating with the requesting customer. In general, the visualization tool 200 may calculate an estimated cost for providing any telecommunication service to a customer at any location.

As described above, the visualization tool 200 of the telecommunications network obtains information concerning the network from various databases and/or informational spreadsheets, aggregates the information into a database, and displays the information in the user interface of the tool to aid in providing a telecommunication service to a customer. Through the user interface of the visualization tool 200, a network administrator may determine the network services available to a potential customer of the network and may generate a plan to provide the services to the customer's location. For example, the information may include one or more connection locations to the telecommunications network and provide an estimated cost to the network and/or the customer for providing the service to the customer based on a location of the customer entered into the visualization tool. Further, in one embodiment, at least a portion of the order to provide the services to the potential customer may be automatically generated from the information in the database and provided to a field technician for installation of the service.

Figure 18:
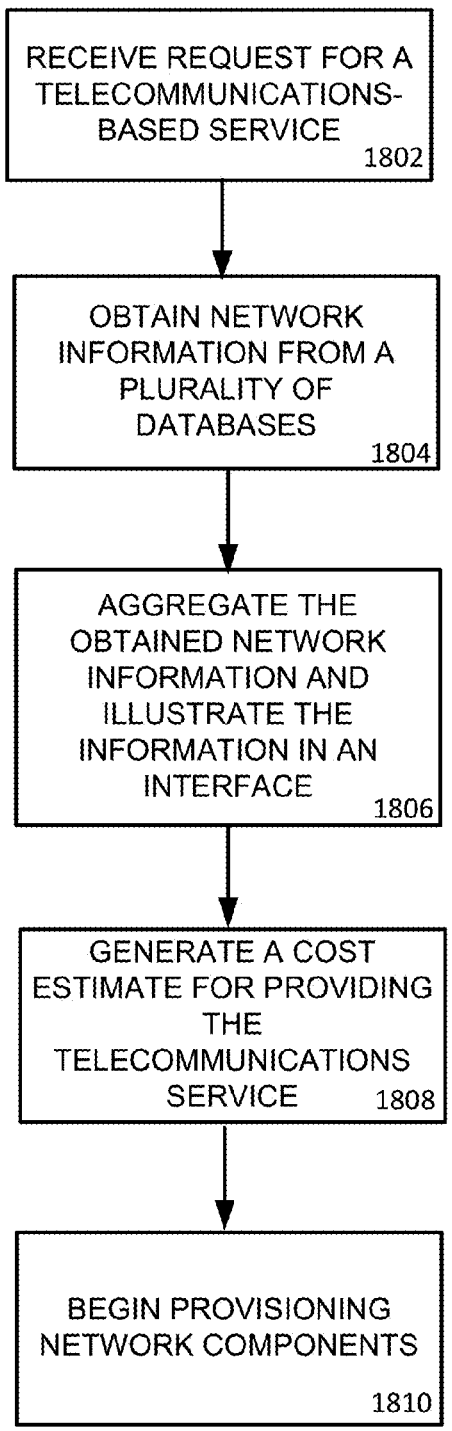
FIG. 18 is a flowchart of a method for a visualization tool to obtain network information and calculate an estimated cost for provided a requested telecommunications service.

FIG. 18 is a flowchart of a method for a visualization tool 200 to obtain network information and calculate an estimated cost for provided a requested telecommunications service. Beginning in operation 1802, the visualization tool (or an administrator of a telecommunications network) receives a request for a telecommunications-based service from a customer or potential customer. In operation 1804, the visualization tool 200 accesses one or more databases to obtain information concerning an associated telecommunications network and other information that may relate to the requested service. For example, the visualization tool 200 may access a database or databases that include a table of CLLI code locations and prior order histories for a network. In addition, the visualization tool 200 may access a database of maps or other location-based information. In general, such databases may be external to a network, internal to a network, and/or managed and maintained by the network.

Figure 19:
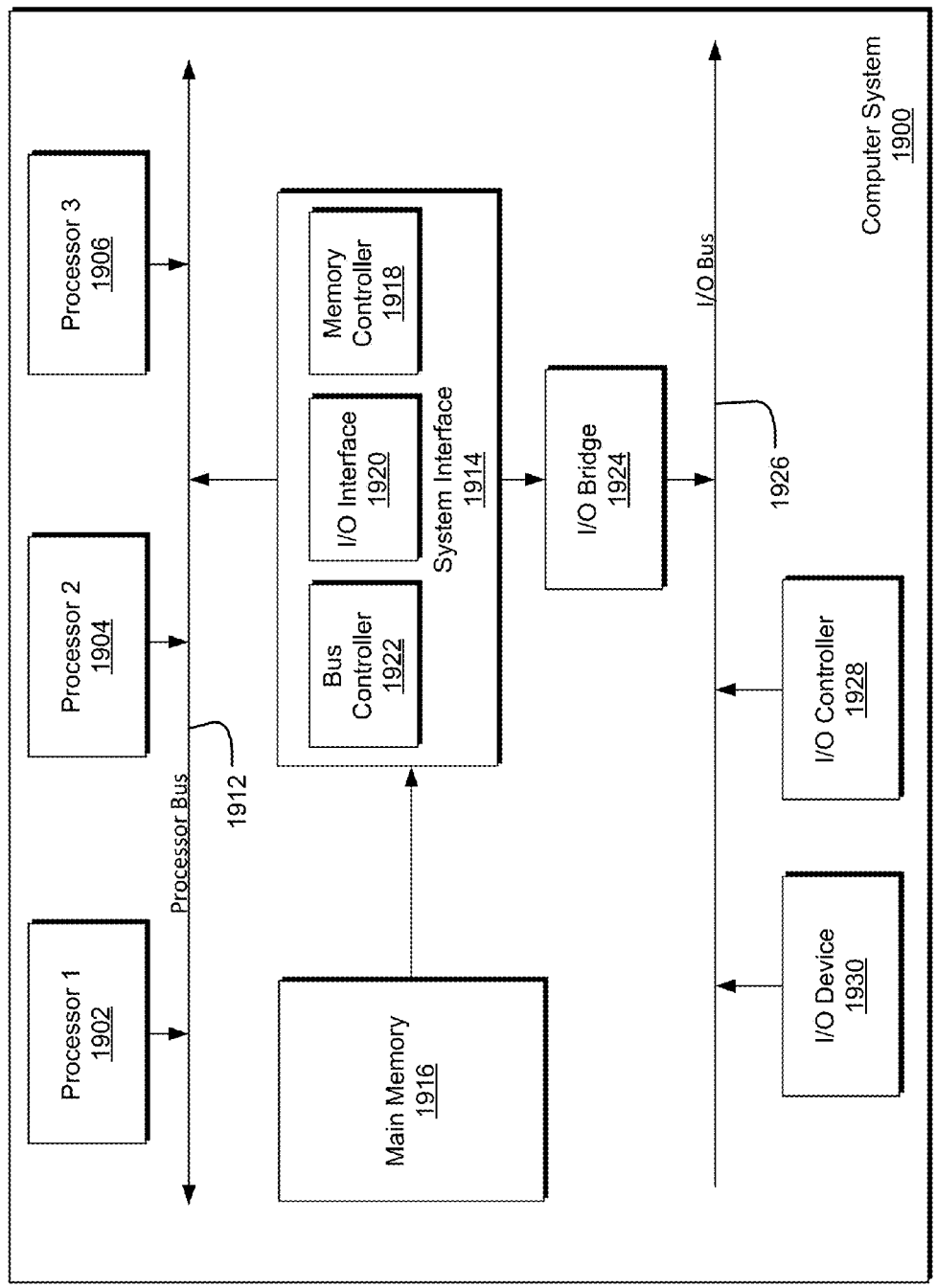
FIG. 19 is a diagram illustrating an example of a computing system which may be used in implementing embodiments of the present disclosure.

In operation 1806, the visualization tool 200 aggregates the obtained information from the databases and displays the aggregated information in a user interface of the tool. The interface may include options for viewing or not viewing the gathered information, as described above. Further, the information may be presented in a combined manner, such as by overlaying network fiber information over a map of a selected region. With the information aggregated, the visualization tool 200 may generate a cost estimate for providing the service to the requesting party. Such a cost estimate may be based at least on a network footprint of connection points and lines in relation to an obtained map of a region and/or a history of prior and similar services provided to customers at or near the requesting customer. Such a cost may be provided to a user of the visualization tool 200 or an administrator of the network. Further, the visualization tool 200 may begin provisioning one or more network components in response to the cost estimate and aggregated information in operation 1810. Such provisioning may include providing one or more instructions to an installer of the service to the customer's location and/or creating bandwidth on the network for the requested service. In this manner, the FIG. 19 is a block diagram illustrating an example of a computing device or computer system 1900 which may be used in implementing the embodiments of the components of the network disclosed above. For example, the computing system 1900 of FIG. 19 may be used to implement the visualization tool 200 discussed above. The computer system (system) includes one or more processors 1902-1906. Processors 1902-1906 may include one or more internal levels of cache (not shown) and a bus controller or bus interface unit to direct interaction with the processor bus 1912. Processor bus 1912, also known as the host bus or the front side bus, may be used to couple the processors 1902-1906 with the system interface 1914. System interface 1914 may be connected to the processor bus 1912 to interface other components of the system 1900 with the processor bus 1912. For example, system interface 1914 may include a memory controller 1914 for interfacing a main memory 1916 with the processor bus 1912. The main memory 1916 typically includes one or more memory cards and a control circuit (not shown). System interface 1914 may also include an input/output (I/O) interface 1920 to interface one or more I/O bridges or I/O devices with the processor bus 1912. One or more I/O controllers and/or I/O devices may be connected with the I/O bus 1926, such as I/O controller 1928 and I/O device 1940, as illustrated.

I/O device 1940 may also include an input device (not shown), such as an alphanumeric input device, including alphanumeric and other keys for communicating information and/or command selections to the processors 1902-1906. Another type of user input device includes cursor control, such as a mouse, a trackball, or cursor direction keys for communicating direction information and command selections to the processors 1902-1906 and for controlling cursor movement on the display device.

System 1900 may include a dynamic storage device, referred to as main memory 1916, or a random access memory (RAM) or other computer-readable devices coupled to the processor bus 1912 for storing information and instructions to be executed by the processors 1902-1906. Main memory 1916 also may be used for storing temporary variables or other intermediate information during execution of instructions by the processors 1902-1906. System 1900 may include a read only memory (ROM) and/or other static storage device coupled to the processor bus 1912 for storing static information and instructions for the processors 1902-1906. The system set forth in FIG. 19 is but one possible example of a computer system that may employ or be configured in accordance with aspects of the present disclosure.

According to one embodiment, the above techniques may be performed by computer system 1900 in response to processor 1904 executing one or more sequences of one or more instructions contained in main memory 1916. These instructions may be read into main memory 1916 from another machine-readable medium, such as a storage device. Execution of the sequences of instructions contained in main memory 1916 may cause processors 1902-1906 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1916. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for visualizing telecommunications data for providing an estimated quote for a requested service, the method comprising:
    retrieving technical infrastructure data for a telecommunications network from one or more databases, the technical infrastructure data representing network footprints and connection locations and a map of a geographic region, wherein the technical infrastructure data further comprises:
        at least one of an existing and an ordered entrance facility agreement between the telecommunications network and one or more vendors; and
        network-to-network information (NNI) including at least one of a reference to an internal NNI identification number, an order number, vendor name, NNI connection point, and utilization percentage of an ordered connection;
    obtaining location information for at least one requesting customer;
    correlating the technical infrastructure data with the location information for the at least one requesting customer;
    determining a network access point for providing one or more telecommunication products based on the correlation of the technical infrastructure data with the location information; and
    generating a service plan and estimated cost based on the network access point and the at least one configured customer site using at least one computing unit.

2. The method of claim 1 further comprising:
    displaying the correlated information in a user interface displayed on a computing device.

3. The method of claim 2 wherein the map of the geographic region includes the location information for the at least one requesting customer.

4. The method of claim 3 wherein the map of the geographic region comprises the location information for the at least one requesting customer and a visualization of the technical infrastructure data.

5. The method of claim 4 wherein the displayed correlated information comprises the map of the geographic region including the location information for the at least one requesting customer and the visualization of the technical infrastructure data.

6. The method of claim 5 wherein the network footprints comprises a footprint of the fiber transmission lines of the telecommunications network and the displayed correlated information further comprises the footprint of the fiber transmission lines of the telecommunications network in the map of the geographic region.

7. The method of claim 1 wherein the one or more databases comprise a plurality of websites for accessing the map of the geographic region, the plurality of websites accessible through one or more Internet Protocol addresses.

8. The method of claim 1 wherein the one or more databases comprise a database managed by the telecommunications network.

9. The method of claim 1 wherein the technical infrastructure data for a telecommunications network further comprises a list of past service orders provided by the telecommunications network based on the location information for the at least one requesting customer.

10. The method of claim 2 wherein the user interface further comprises a plurality of selectable toggle switches for selecting different views of the displayed correlated information, the selection of the toggle switches received at the computing device through an input device.

11. One or more non-transitory tangible computer-readable storage media storing computer-executable instructions for performing a computer process on a computing system, the computer process comprising:
    retrieving technical infrastructure data for a telecommunications network from one or more databases, the technical infrastructure data representing network footprints and connection locations and a map of a geographic region, wherein the technical infrastructure data further comprises:
        at least one of an existing and an ordered entrance facility agreement between the telecommunications network and one or more vendors; and
        network-to-network information (NNI) including at least one of a reference to an internal NNI identification number, an order number, vendor name, NNI connection point, and utilization percentage of an ordered connection;
    obtaining location information for at least one requesting customer;

correlating the technical infrastructure data with the location information for the at least one requesting customer;

determining a network access point for providing one or more telecommunication products based on the correlation of the technical infrastructure data with the location information; and generating a service plan and estimated cost based on the network access point and the at least one configured customer site using at least one computing unit.

12. The one or more non-transitory tangible computer-readable storage media of claim 11 for storing computer-executable instructions for performing a computer process on a computing system, the computer process further comprising:

displaying the correlated information in a user interface displayed on a computing device.

13. The one or more non-transitory tangible computer-readable storage media of claim 12 wherein the map of the geographic region includes the location information for the at least one requesting customer.

14. The one or more non-transitory tangible computer-readable storage media of claim 13 wherein the map of the geographic region comprises the location information for the at least one requesting customer and a visualization of the technical infrastructure data.

15. The one or more non-transitory tangible computer-readable storage media of claim 14 wherein the displayed correlated information comprises the map of the geographic region including the location information for the at least one requesting customer and the visualization of the technical infrastructure data.

16. The one or more non-transitory tangible computer-readable storage media of claim 15 wherein the network footprints comprises a footprint of the fiber transmission lines of the telecommunications network and the displayed correlated information further comprises the footprint of the fiber transmission lines of the telecommunications network in the map of the geographic region.

17. A system for aggregating telecommunications network data, the system comprising:

at least one external database to a telecommunications network for storing mapping information;

at least one internal database to the telecommunications network for storing network configuration information; and a visualization tool operating on a computing system, the computing system executing one or more computer-executable instructions retrieved from one or more non-transitory tangible computer-readable storage media storing computer-executable instructions for performing a computer process, the computer process comprising:

retrieving the network configuration information from the at least one internal database, the network configuration information representing network footprints and connection locations and a map of a geographic region, wherein the network configuration information further comprises:

at least one of an existing and an ordered entrance facility agreement between the telecommunications network and one or more vendors; and network-to-network information (NNI) including at least one of a reference to an internal NNI identification number, an order number, vendor name, NNI connection point, and utilization percentage of an ordered connection;

obtaining location information for at least one requesting customer and associating the location information with the mapping information from the at least one external database;

correlating network configuration information with the location information for the at least one requesting customer;

determining a network access point for providing one or more telecommunication products based on the correlation of the network configuration information with the location information; and generating a service plan and estimated cost based on the network access point and the at least one configured customer site using at least one computing unit.

18. The system of claim 17 wherein the computer process executed by the visualization tool further comprises:

displaying the correlated information in a user interface displayed on a computing device.

19. The system of claim 18 wherein the displayed correlated information comprises a map of a geographic region including the location information for the at least one requesting customer and a visualization of the network configuration information.

20. The system of claim 19 wherein the network configuration information comprises a footprint of the fiber transmission lines of the telecommunications network and the displayed correlated information further comprises the footprint of the fiber transmission lines of the telecommunications network in the map of the geographic region.

\* \* \* \* \*